United States Patent [19]

Cavill et al.

[11] Patent Number: 4,777,609

[45] Date of Patent: Oct. 11, 1988

[54] PRINT HEAD MOTOR CONTROL SYSTEM HAVING STEADY STATE VELOCITY COMPENSATION

[75] Inventors: Barry R. Cavill, Charlotte; Charles D. Malkemes, Matthews, both of N.C.; Kevin M. Reinberg, Boca Raton, Fla.; Raymond A. Schultz, Manassas, Va.

[73] Assignee: International Business Machines Corporation, Armonk, N.Y.

[21] Appl. No.: 807,708

[22] Filed: Dec. 11, 1985

[51] Int. Cl.[4] .................... G05B 13/00; B41J 23/36
[52] U.S. Cl. .................................. 364/519; 364/174; 318/599; 400/322
[58] Field of Search ................ 364/174, 519, 900; 318/561, 599, 603; 344/140 R; 400/322, 229

[56] References Cited

U.S. PATENT DOCUMENTS

| | | | |
|---|---|---|---|
| 3,213,343 | 10/1965 | Sheheen | 318/341 |
| 3,416,052 | 12/1968 | Russell et al. | 318/599 |
| 3,512,066 | 5/1970 | Gerber et al. | 318/138 |
| 3,582,750 | 6/1971 | Halfhill | 318/599 |
| 3,617,715 | 11/1971 | Dummermuth | 318/571 |
| 3,742,326 | 6/1973 | Okuda et al. | 318/603 |
| 3,813,592 | 5/1974 | Ryberg | 318/696 |
| 3,947,738 | 3/1976 | Oliver | 318/341 |
| 4,006,391 | 2/1977 | Deering et al. | 318/811 |
| 4,138,632 | 2/1979 | Pauwels et al. | 318/599 |
| 4,143,310 | 3/1979 | Fujinawa et al. | 318/571 |
| 4,146,828 | 3/1979 | Ross et al. | 318/599 |
| 4,146,922 | 3/1979 | Brown et al. | 364/174 |
| 4,147,967 | 4/1979 | Aiena | 318/341 |
| 4,215,302 | 7/1980 | Chiang | 318/696 |
| 4,226,546 | 10/1980 | Hoffman | 318/341 |
| 4,261,039 | 4/1981 | Baker | 364/519 |
| 4,262,613 | 4/1981 | Landoni | 112/118 |
| 4,270,868 | 6/1981 | Morgan et al. | 400/320 |
| 4,277,191 | 7/1981 | Davis | 364/174 |
| 4,280,082 | 7/1981 | Acharya et al. | 318/341 |
| 4,280,084 | 7/1981 | Chiang | 318/696 |
| 4,284,362 | 8/1981 | Jackson et al. | 400/124 |
| 4,297,626 | 10/1981 | Chiang | 318/696 |
| 4,324,499 | 4/1982 | Giacone | 318/341 |
| 4,368,412 | 1/1983 | Inoue | 318/632 |
| 4,371,819 | 2/1983 | Kaufmann | 318/341 |
| 4,422,178 | 12/1983 | Almfield et al. | 400/322 |
| 4,459,050 | 7/1984 | Goldberg et al. | 400/121 |
| 4,459,675 | 7/1984 | Bateson et al. | 364/519 |
| 4,460,968 | 7/1984 | Cavill | 364/519 |
| 4,463,435 | 7/1984 | Cavill | 364/519 |
| 4,490,796 | 12/1984 | Bigbie et al. | 364/519 |
| 4,506,321 | 3/1985 | Comstock et al. | 318/561 |

OTHER PUBLICATIONS

Vol. 23, No. 11, Apr. 1981, IBM Technical Disclosure Bulletin, DC Servo Drive Control Algorithm by P. Short, pp. 5000-501.
Vol. 21, No. 1 Jun. 1978, IBM Technical Disclosure Bulletin, Performance-Optimized Velocity Servo System by J. W. Pettit, pp. 239-241.
Vol. 27, No. 4B, Sep. 1984, IBM Technical Disclosure Bulletin, Improved Pulse-Width Modulated Motor Control Technique by R. A. Schulz.

*Primary Examiner*—Parshotam S. Lall
*Assistant Examiner*—Ellis B. Ramirez
*Attorney, Agent, or Firm*—Philip R. Wadsworth; George E. Grosser

[57] ABSTRACT

A control system for a printer having a print head bidirectionally movable at speeds selected from either a first group of speeds or a second group of speeds which employs a microcomputer to generate a digital signal representing the percentage of time a preselected voltage level should be applied to drive the motor which controls the print head speed. The motor includes an integral dual channel incremental optical encoder which generates a pulse each time an emitter is detected, the pulse being directed back to the microcomputer as measured speed information. The microcomputer compares the measured speed information with the desired speed information during predetermined time intervals and if they differ changes the value of the digital signal by an equal amount for each time interval until the desired speed is obtained or until a different print head speed is desired. A different method is used to determine both the measured speed information and the desired speed information depending on whether the desired speed falls within the first or second group of speeds.

5 Claims, 23 Drawing Sheets

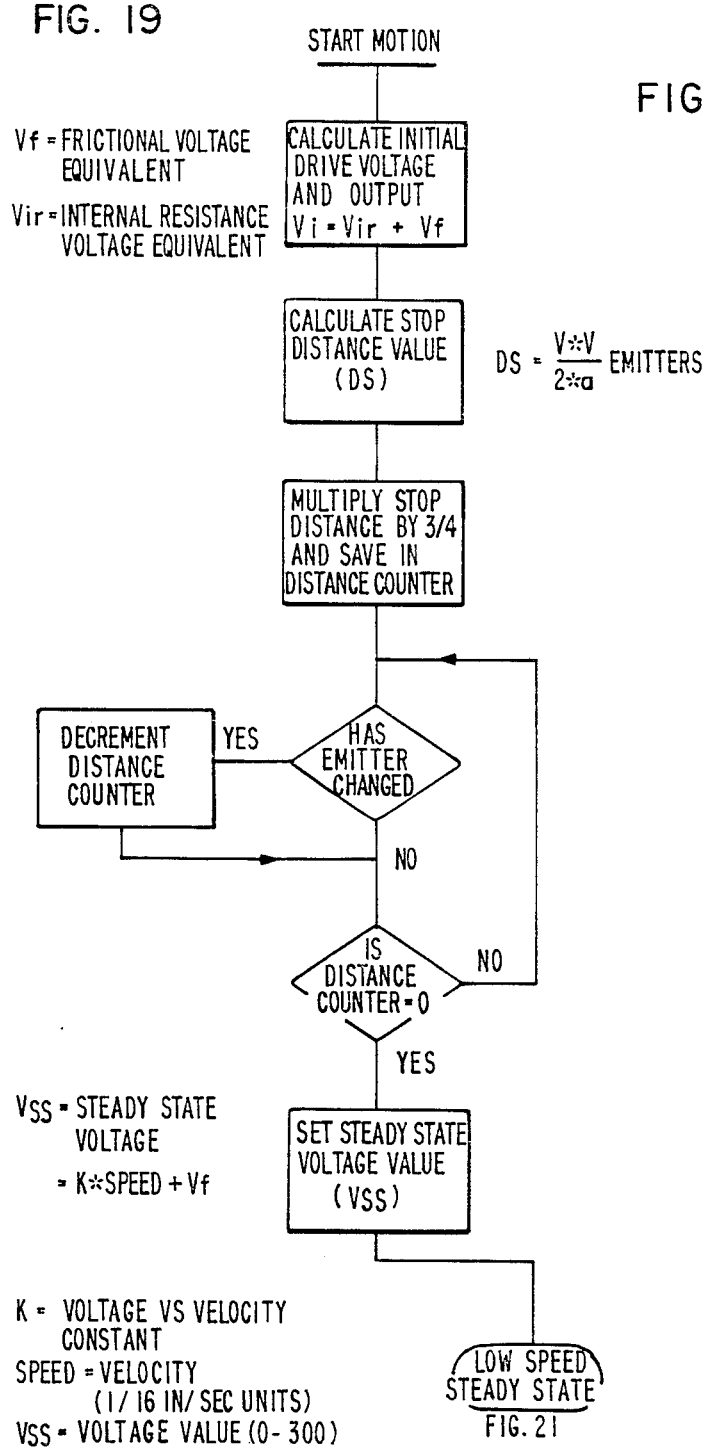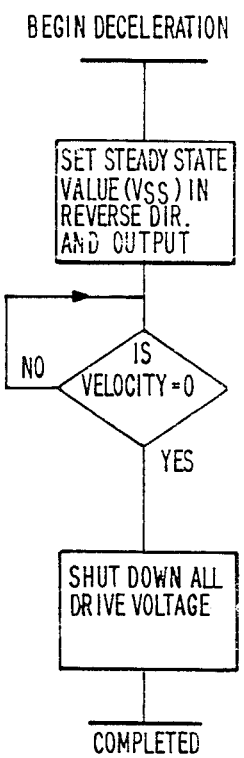

$V_{SS} = V_f + SPEED * K$ $V_f$ = FRICTIONAL VOLTAGE EQUIVALENT (FROM POR PARAMETER CALCULATIONS)

$K$ = VOLTAGE VS VELOCITY CONSTANT (FROM POR PARAMETER CALCULATIONS)

$V_{ir}$ = CALCULATED VOLTAGE EQUIVALENT OF INTERNAL MOTOR RESISTANCE

NOTE: INTERRUPTS CONTINUE UNTIL VMAX VALUE IS REACHED

DECELERATION SEQUENCE
(TURNAROUND)
|
VELOCITY = 0
|
MAGNITUDE OF
OUTPUT VOLTAGE
IS INCREASED
BY 2 * Vf
|
SET NEW MAX.
VOLTAGE TARGET
VALUE
VMAX = VSS + Vir
|
OUTPUT
NEW
VOLTAGE
VALUE
|
CONTINUE ACCELERATION UNTIL
OUTPUT VOLTAGE = VMAX
AS FOR ACCELERATION SEQUENCE

PRINT HEAD MOTOR CONTROL SYSTEM HAVING STEADY STATE VELOCITY COMPENSATION

BACKGROUND OF THE INVENTION

The present invention relates to print head motor control systems and more particularly to a print head motor control system in which the steady-state velocity is monitored and adjusted for correctness incrementally by equal amounts during predetermined time intervals.

Typically, in the past, printers have operated at a single or at best just a few different speeds. In these types of systems, normally a conventional servo-mechanism velocity control system has been employed. In such conventional systems, the steady-state velocity is adjusted to a desired value by taking the difference between the measured speed and the desired speed and changing the drive voltage of the motor by a magnitude which instantaneously attempts to correct the steady-state speed to the desired value. However, in printers where numerous different print head speeds are utilized, such a steady-state control method would be extremely difficult because of the large number of velocity references required and instability could result if sufficient processor bandwidth is not utilized for velocity compensation.

The present invention employs a technique which incrementally adjusts the measured speed by equal amounts towards the desired speed during predetermined time intervals, rather than trying to instantaneously adjust the measured speed to the desired speed, and thus provides a suitable system for multispeed printer operation requiring a minimum of micro-processor bandwidth.

SUMMARY OF THE INVENTION

In accordance with this invention, a print head control system is provided using a microcomputer to provide open loop acceleration and deceleration and to regulate the steady-state velocity of the print head. The microcomputer output is supplied to the input of a motor control circuit which regulates the voltage applied to the motor and thus the speed of the motor. In the preferred embodiment, the motor includes an integral incremental encoder which generates measured speed information. Once the steady-state velocity has been reached, that is when acceleration has been completed, the microcomputer compares the measured speed information with desired speed information and incrementally changes its output to vary the voltage applied to the motor by an equal amount during each predetermined time period until the desired motor speed is obtained, or deceleration is initiated.

BRIEF DESCRIPTION OF THE DRAWINGS

FIG. 4b is a graph of the pulse width modulation signal waveform generated by the timer/counter 10 of FIG. 4a;

FIG. 19 is a flow chart of the low speed start of motion process of the present invention;

FIG. 23 is a flow chart of the low speed acceleration process of the present invention;

DESCRIPTION OF THE PREFERRED EMBODIMENT

Figure 1:
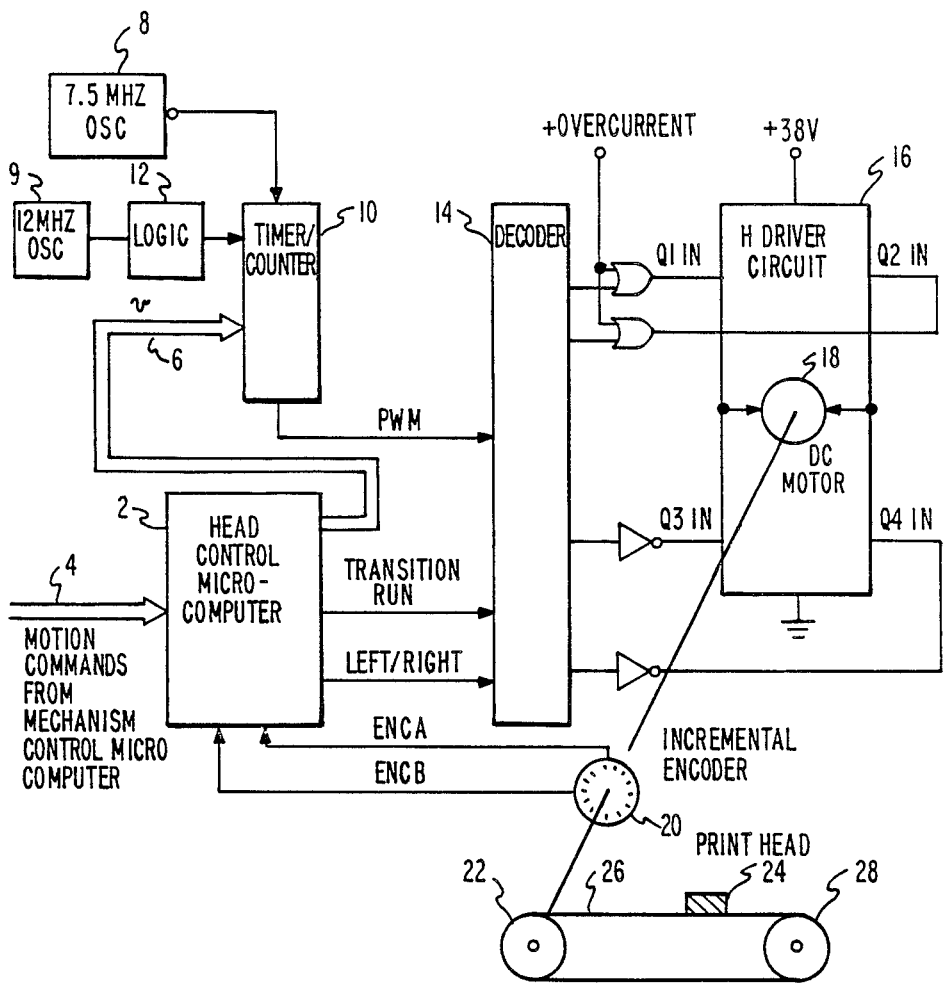
FIG. 1 is a block diagram of the print head motor control system of the present invention.
Figure 2:
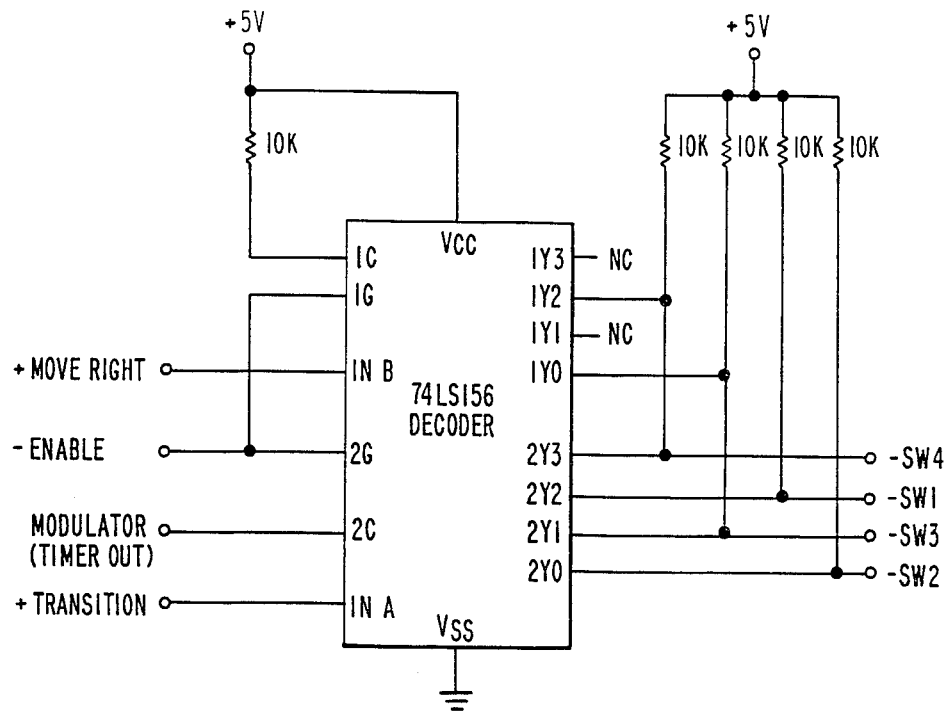
FIG. 2 is a schematic diagram of the decoder 14 of FIG. 1.

Referring now to FIG. 1, the print head motor control system comprises a head control microcomputer 2 which is connected to the mechanism control microcomputer 3 via the command lines 4. The head control microcomputer 2 is also connected via line 6 to the timer/counter 10. The timer/counter 10 is also connected to a 7.5 MHz clock 8 and the divider logic circuit 12 which is used to divide a 12 MHz signal down to a 25 kHz trigger signal for the timer/counter module 10. A decoder 14 has one of its inputs connected to the output of the timer/counter 10 and two additional inputs connected to the respective outputs of the head control microcomputer 2 which provides a transition region signal and a left-right directional signal to the decoder 14. The decoder 14 has four drive control outputs which are connected to respective inputs of a standard H driver circuit 16 which is used to drive the brushtype DC motor 18. The DC motor 18 also includes an integral dual-channel incremental encoder 20 which generates two symmetrical signals, encoder A and encoder B used in combination to provide velocity and direction information, which are directed back to the respective inputs of the head control microcomputer 2. The motor is mechanically connected to a pulley 22 which is used to drive the print head 24 which is connected to a continuous belt 26 which also is guided by the second pulley 28. In the preferred embodiment, the head control microcomputer is an Intel 8031 with 8K of ROS; the logic 12 is comprised of 74LS90 and 74LS393 circuits; the timer/counter 10 is an Intel 8254 timer module; the decoder 14 is a 74156 multiplexor manufactured by Texas Instruments and has its outputs connected in the manner illustrated in FIG. 2 to provide a custom 3-4 decoder; the H driver circuit is illustrated in FIGS. 5a-5d; the DC brush type motor is a Clifton Precision Model JDH-2250-DF-1C with Litton Model 72DBI-900-375-5-6M shaft encoder; and the mechanism control microcomputer is an Intel 80188.

Figure 3A:
FIG. 3a is the velocity profile for the print head operation of the present invention.
Figure 3B:
FIG. 3b is a graph of the constant voltage waveform representing the IR drop of the motor of the present invention.
Figure 3C:
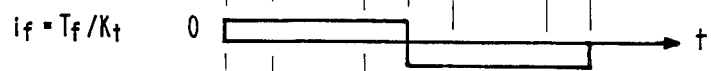
FIG. 3c is a graph of the voltage waveform necessary to overcome the friction component of the motor the polarity of which will be determined by the direction of motion as shown.
Figure 3D:
FIG. 3d is a graph of the voltage waveform necessary to overcome the back Emf term of the motor of the present invention.
Figure 3E:
FIG. 3e is the voltage waveform representing the total motor voltage necessary to drive the motor of the present invention.

In operation, the head control microcomputer 2 receives print commands, run commands including direction information, and maximum print speed commands from the mechanism control microcomputer 3. The head control microcomputer 2 determines the voltage drive required to obtain the desired steady-state velocity based on the command information from the mechanism control microcomputer 3 and predetermined information about the printhead motor 18 characteristics which will be explained in more detail hereinafter. For example, the voltage profile used by the head control microcomputer 2 to drive the DC motor 18 at high speeds is determined by summing the voltage required to overcome the internal resistance of the motor while accelerating or decelerating, the voltage required to overcome the frictional characteristics of the motor and the voltage required to cause acceleration as illustrated respectively in FIGS. 3b, 3c and 3d. Thus, the total voltage required to drive the DC motor 18 at high speeds in accordance with the velocity profile of FIG. 3a is illustrated in FIG. 3e. Based on the motion and speed command information from the mechanism control microcomputer 3 and the voltage vs. velocity characteristics of the particular motor, the head control microcomputer 2 determines the appropriate drive voltage for the DC motor 18 and generates a drive voltage valve on the line 8 representative of the duration of time to apply the drive voltage to the DC motor 18. The drive voltage value is a number from 0 to 300 with 300 representing application of 38 volts for 100% of the time period and lesser values representing application of 38 volts for reduced times. The drive voltage value is converted into a pulse width modulation (PWM) signal by the timer 10 and directed to the decoder 14 which is conjunction with the state of the transition region and left-right control lines determines the selection of the transistors receiving the applied voltage in the H driver circuit 16. The timer/counter 10 is used in single shot mode 3. A functional block diagram of the timer/counter 10 is illustrated in FIG. 3.

Figure 4A:
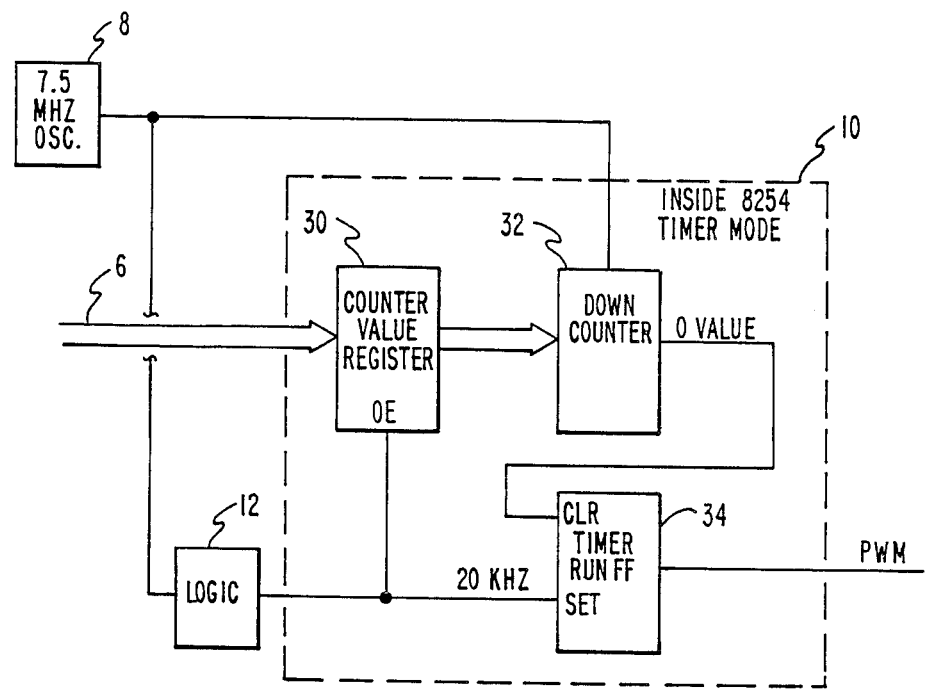
FIG. 4a is a block diagram of the timer/counter 10 of FIG. 1.
Figure 4B:
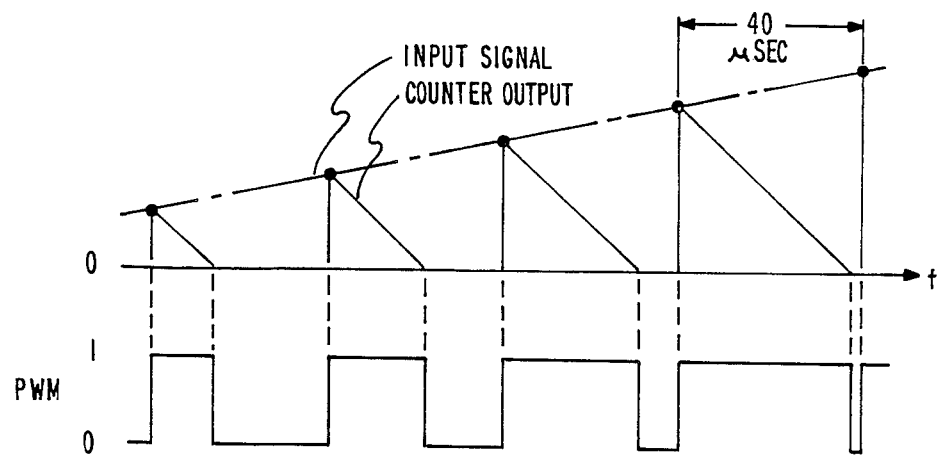

Referring now to FIG. 4a, the operation of the timer/counter 10 will be described in greater detail. The 7.5 MHz oscillator 8 generates a clock signal which is also directed to the input of the divide down logic 12. The logic 12 generates a 25 kHz square wave used as a trigger to continually restart the timer running. The 25 kHz signal generates a fixed 40 microsecond period which is used to set the timer run flip flop 34 and preset the down counter 32 with the output count value from the head control microcomputer 2 saved in the counter value register 30 every 40 microseconds. The 7.5 MHz clock signal decrements the down counter 32 and when the counter reaches zero, the timer run flip flop 34 is reset causing the timer/counter 10 output to fall. The result is a constant period waveform with a duty cycle that can vary between 0 and 100 percent as illustrated in FIG. 4b, depending upon the output count value from the head control microcomputer 2.

As mentioned earlier, the print head motor 18 is controlled by the H drive circuit 16 by way of outputs from the decoder 14. The truth table for the decoder 14 outputs (inputs to the H driver circuit) is illustrated below.

| HEAD MOTOR LOGIC TRUTH TABLE P = Pulsating (Modulator) X = don't care | | | | | | |
|---|---|---|---|---|---|---|
| | | +TRANS. | TRANSISTOR STATE | | | |
| ACTION | +RIGHT | REGION | Q1 | Q2 | Q3 | Q4 |
| DRV LEFT | 0 | 0 | OFF | P | ON | OFF |
| TR. LEFT | 0 | 1 | OFF | OFF | P | OFF |
| DRV. RT. | 1 | 0 | P | OFF | OFF | ON |
| TR. RT. | 1 | 1 | OFF | OFF | OFF | P |
| INACTIVE | X | X | OFF | OFF | OFF | OFF |

Figure 5A:
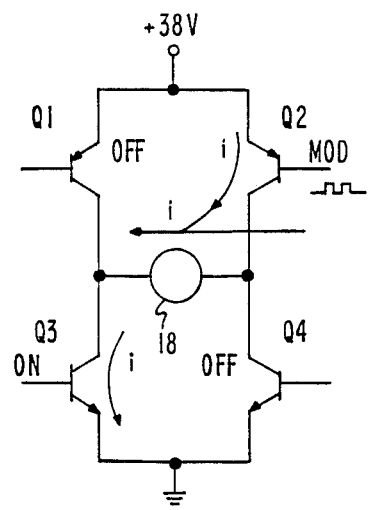
FIGS. 5a–5d illustrate schematic drawings of the H driver circuit 16 of FIG. 1.
Figure 5B:
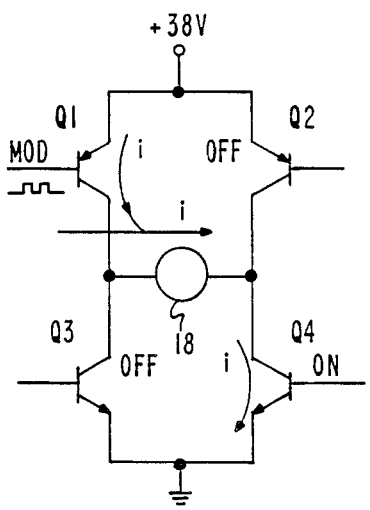

Referring now to FIGS. 5a-5d, the operation of the H driver circuit 16 will be explained. When the print head motor 18 is driving the print head 24 to the left, the right-left input line and the transition region input line to the decoder 14 are both inactive such that the transistor Q1 is turned off, the transistor Q2 is pulsing in accordance with the PWM signal from the timer/counter 10, the transistor Q3 is turned on and the transistor Q4 is turned off. Thus, as can be seen in FIG. 5a, the current path is set up from the 38 volt source through the transistor Q2, through the motor 18 and the transistor Q3 to ground. The duty cycle of the PWM signal being input to the transistor Q2 determines how long the Q2 transistor is turned on and thus regulates the time period the reference voltage is used to drive the motor 18. On the other hand, if the print head motor 18 is driving the print head 24 to the right, the left-right control line from the head control microcomputer 2 will be active and the transition region signal line from the head control microcomputer 2 will be inactive. Thus, the transistor Q1 will be pulsing at a rate determined by the PWM signal from the timer/counter 10, the transistors Q2 and Q3 will be turned off and the transistor Q4 will be active. Thus, as can be seen in FIG. 5b, a current path is set up from the transistor Q1 through the motor 18 through the transistor Q4 to ground, the current flowing in an opposite direction through the motor than when the motor was being driven to the left. Again, the duty cycle of the PWM signal determines how long the Q1 transistor is turned on and therefore regulates the time period the reference voltage is being used to drive the motor 18 and thus regulates the speed of the motor.

Different requirements are necessary when the print head motor 18 is in the transition mode. Transition mode is that time when only one transistor is actively pulsing with all other transistors off. This mode becomes active when stopping from high speed and when the steady state drive voltage value is greater than the internal resistance voltage value. Transition mode is active until the voltage value when stopping reaches zero. At that point, drive is applied to two transistors, either Q1 and Q4 or Q2 and Q3, with the top transistor pulsing (either Q1 or Q2) and the bottom transistor (either Q4 or Q3) active.

The voltage values used in the head control microcomputer 2 are 2's complement numbers with a positive value indicating that one is driving to the right and a negative number indicating that one is driving to the left. The timer and modulator never see the negative numbers because the head control microcomputer 2 generates the absolute value of the number for sending to the timer and the left/right direction control lines determine whether the effective number is positive or negative.

During the transition period, the complement of the voltage is generated because the function of the decoder 14 is not to supply a voltage during that time period but to regulate the release of current from the motor. The regulation is performed by gradually increasing the current flow from the motor 18 as it slows down. The object is to obtain an average constant current while decelerating, instead of a large amount of current being released when deceleration is begun and then very little current being released thereafter. Thus, the use of large transistors is not required for high currents and a controlled deceleration without feedback is accomplished.

Figure 6:
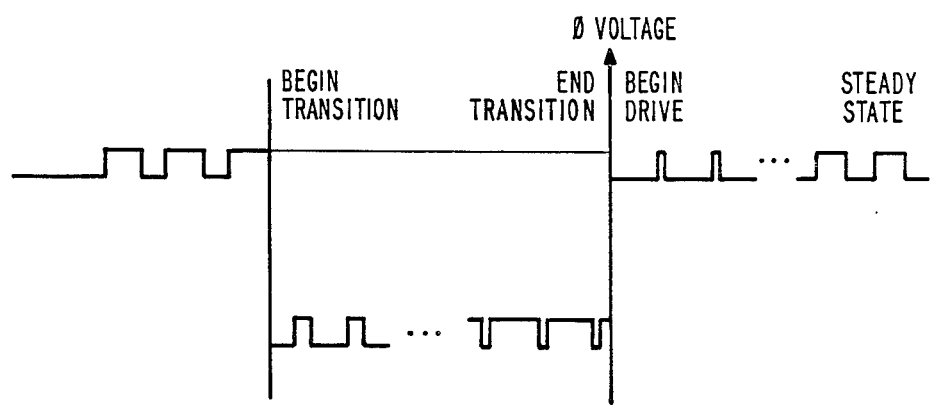
FIG. 6 is a graph of the pulse width modulator signal waveform output by the decoder 14 of FIG. 1 during the transition mode of operation of the motor of the present invention.

This action is illustrated in FIG. 6 wherein the modulator signal as it comes out of the decoder 14 is shown. It should be understood that the signal value is complemented while in the transition mode. Also the pulse width is increasing in the transition mode from a moderate to a large value. After the transition mode is completed, the pulse width starts out small and increases from there.

Figure 5C:
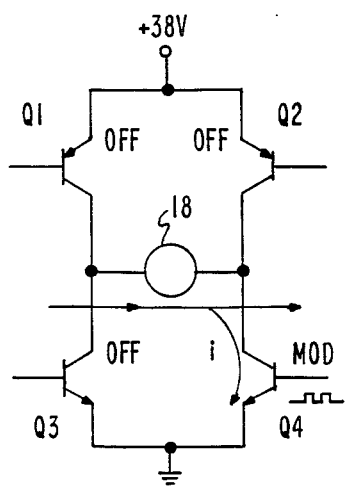

More specifically, as shown in FIG. 5c, when the print head 24 is in a transition from left to right, only the transistor Q4 is being driven by the PWM signal. This enables current from the motor to be released in a controlled manner resulting in an average constant current while stopping. Transistor Q4 is pulsed until the voltage value used in pulsing is decreased to 0. The PWM signal is then applied to the upper transistor Q1.

Figure 5D:
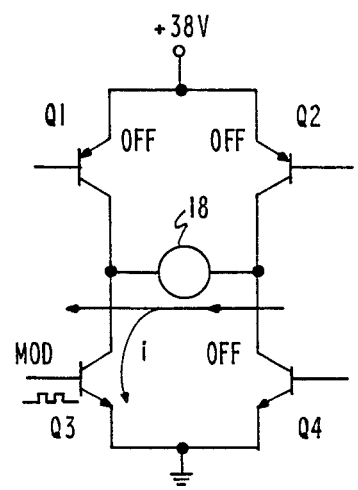

Finally, referring to FIG. 5d, when the print head 24 is in a transition from right to left, the left-right control line from the head control microcomputer 2 and the transition region signal line are such that the transistor Q1 is off, the transistor Q1 is off, the transistor Q3 is pulsing with the PWM signal and the transistor Q4 is off. The pusing transistor Q3 provides a path for the current in the motor to be dissipated in a controlled manner, resulting in an average constant current while stopping. Transistor Q3 is pulsed until the voltage value used in pulsing is decreased to 0. The PWM signal is then applied to the upper transistor Q1.

The print head motor 18 also includes an integral dual channel incremental optical encoder 20 which is used for velocity and direction sensing as well as providing carriage position information for firing the print head actuators (not shown). The rotary optical encoder 20 generates two square wave output signals encoder A and encoder B. The encoder signals are identical except there is a 90° phase shift between the two signals. Each square wave cycle corresponds to the movement of the print head a distance of 1/300 of an inch. The faster the movement of the print head, the shorter the time duration of a square wave cycle. The head control microcomputer 2 counts the number of pulses from the incremental encoder and thus is able to monitor the head position and direction of motion of the print head 24 as it moves back and forth across the printing medium.

While the print head 24 is moving at a steady-state speed, the head control microcomputer 2 measures the speed and incrementally adjusts the output count value representing the appropriate motor drive voltage to maintain an average desired steady-state speed. It should be understood that the print head motor control system supports in the preferred embodiment speeds from 3.0" per second to 40" per second in steps of 1/6" per second. In order to operate satisfactorily, the speed range for the system has been divided into two groups, namely those less than 10" per second and those speeds that are greater than or equal to 10" per second. Generally, for the higher speed group, the number of emitter changes detected by the encoder and transmitted to the head control microcomputer 2 as pulses in a 16 millisecond time period is measured at the steady-state speed. The number of encoder pulses that should be received during the same 16 millisecond time period is determined by the head control microcomputer 2 and the two numbers are then compared to see if the measured distance value is larger or smaller than the desired value. If the measured distance value is too large, then the drive to the motor 18 is decreased by one least significant bit of the output count value being output by the head control microcomputer 2 to the timer counter 10. The location in memory that saves the drive value for the left or right direction is also decremented by one least significant bit. However, if the measured distance value is smaller than the desired distance, the output count value and the stored value are increased by one least significant bit. The process is continued every 16 milliseconds until the print head stopping procedure begins. The output count value which remains at the end of the print line is saved and used as the initial output count valve the next time the carriage is moving in the same direction, providing the speed command from the mechanism control microcomputer is not changed. If the speed command from the mechanism control microcomputer is changed, then this output count value is erased and is replaced by a calculated estimate for the new speed. It should be understood that a different output count value is saved for each direction to account for mechanical differences in the motor and mechanism.

For the lower speed group, the time between each emitter of the incremental encoder 20 is much larger than the time between emitters for the higher speeds and thus, a smaller number of pulses are received during the 16 millisecond monitoring time interval from the encoder 20. Thus, the obtainable resolution for the lower speeds is substantially decreased. Therefore, it is necessary to measure the time between one emitter change received during the 16 millisecond period and transmitted to the microcomputer 2 as a pulse having a pulse width reflective of the time between emitters. Additionally, this requires that the head microcomputer 2 calculate the desired time between the emitters (desired pulse width) based on the current speed for comparison with the actual measured value. Then, similarly to the high speed group, if the measured time between emitters is larger than the desired value, then the output count value is incremented by one least significant bit and the location memory that saves the output count value is also incremented. This results in the drive voltage to the motor being applied for longer periods of time. If the measured time between pulses is less than the calculated value then the output count value is decremented by one least significant bit resulting in the motor drive voltage being applied for shorter periods of time and is saved in memory. The process is continued every 16 milliseconds until a print line is complete.

A detailed operation of the head control microcomputer 2 will be explained hereinafter by referring to various flow charts. As mentioned earlier, the microcomputer 2 receives print commands, run commands and maximum print speed commands from the mechanism control computer 3.

Figure 7:
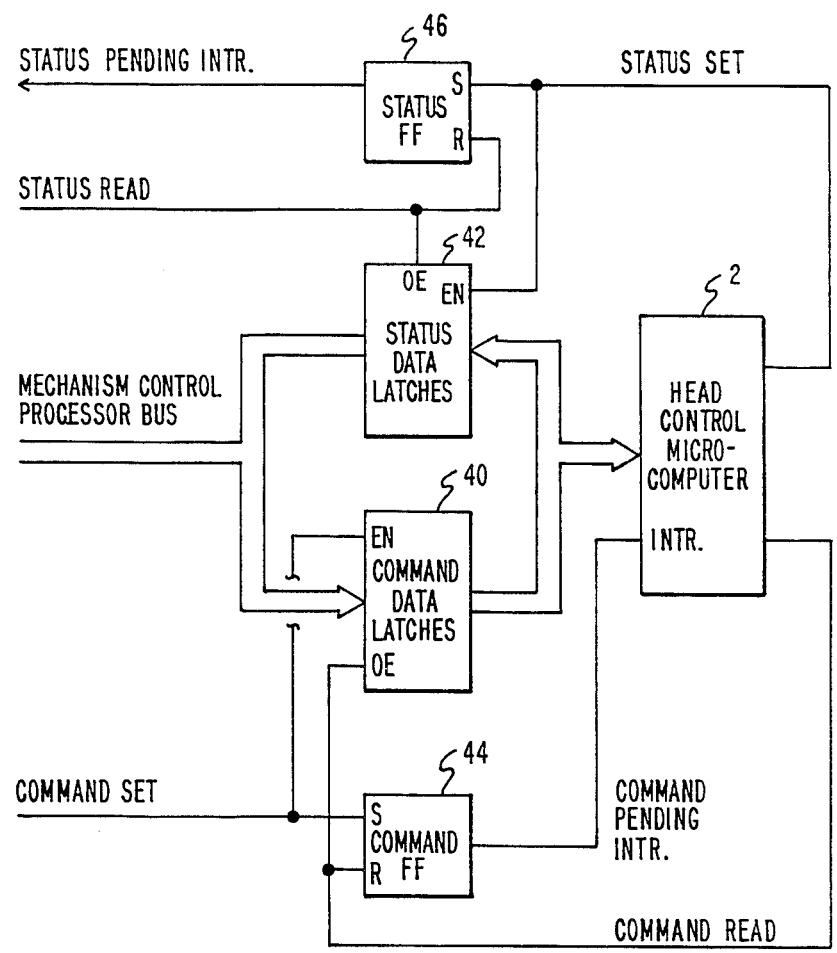
FIG. 7 is a block diagram of the interface circuitry between the head control microcomputer 2 and the mechanism control microcomputer 3 of FIG. 1.

Referring now to FIG. 7, it should be understood that the present system uses conventional hardware typically required for the passing of a single command byte between processors. The system comprises an eight bit latch 40 containing commands from the mechanism control microcomputer 3 and an eight bit latch 42 containing status returned from the head control microcomputer 2. The mechanism control microcomputer 3 places a byte in the command latch 40. This action sets active a separate latch 44 causing an interrupt to the head control microcomputer 2 which then reads the data, resetting the interrupt. The head control microcomputer 2 sends status information back to the mechanism control microcomputer by setting the data in the status latches 42 and setting a separate latch 46 causing an interrupt to the mechanism control microcomputer 3. Each command may comprise one to eight bytes. For each byte sent by the mechanism control microcomputer 3 the head control microcomputer 2 responds that the byte was received. Once the complete command is received (all the command dependent bytes are received), the head control microcomputer 2 then performs the desired action and upon completion of the command, the final response byte is returned. For example, when the mechanism control microcomputer 3 sends a four byte command to the head control microcomputer 2, it sends the first byte and waits for the head control microcomputer 2 to respond with status indicating that the first byte was received. Once the response byte is received then the second byte is sent. Again, the head control microcomputer 2 responds with status indicating the second byte is received. This process is continued until the last byte is sent. The head control microcomputer 2 then acts on the command and the final response byte is sent back to the mechanism control microcomputer indicating completion or error status. The number of bytes per command and the information returned is dependent only on the command function defined. The command function and the number of bytes is determined by the first byte of the command. This first byte is decoded as follows:

| COMMAND BYTE DECODE | | | | | | | |
| --- | --- | --- | --- | --- | --- | --- | --- |
| MB | EXR | D5 | D4 | D3 | DB2 | DB1 | DB0 |

- -MB- This bit will be on if the command is a multi-byte command and off if a single byte command.
- -EXR- This bit will be on if the last (or only) response byte sent back to the Image Processor is not the standard response indicating successful completion or error status (Status Byte 1).
- -D5,D4,D3,DB2,DB1,DB0- These are the command decode bits within the groups defined. For multi-byte commands the number of data bytes following the command byte is given by the bits DB2, DB1, and DB0.

The high order bit indicates whether the command is multi-byte or a single byte command. The second byte indicates whether a standard status response (called "status byte 1") is given to indicate command completion or if the exception response bit is on, indicating the response is some data information. The next three bits are used to uniquely identify commands (decode them). The last three bits have two different meanings. If the command is a multi-byte command (containing up to seven additional bytes) these three bits identify the number of remaining bytes in the command. This information is used in the head control microcomputer 2 to determine when the complete command has been loaded and processing can proceed. If the command is not a multi-byte command (the high order bit is 0) these low three bits are simply used as further command decode. For all multi-byte commands the response "FF" indicates that a byte has been received and "SB1" indicates the response to the last byte of a multi-byte command is "Status Byte 1" which contains uniquely defined error bits. A response of "00" for Status Byte 1 indicates successful command completion.

Figure 8:
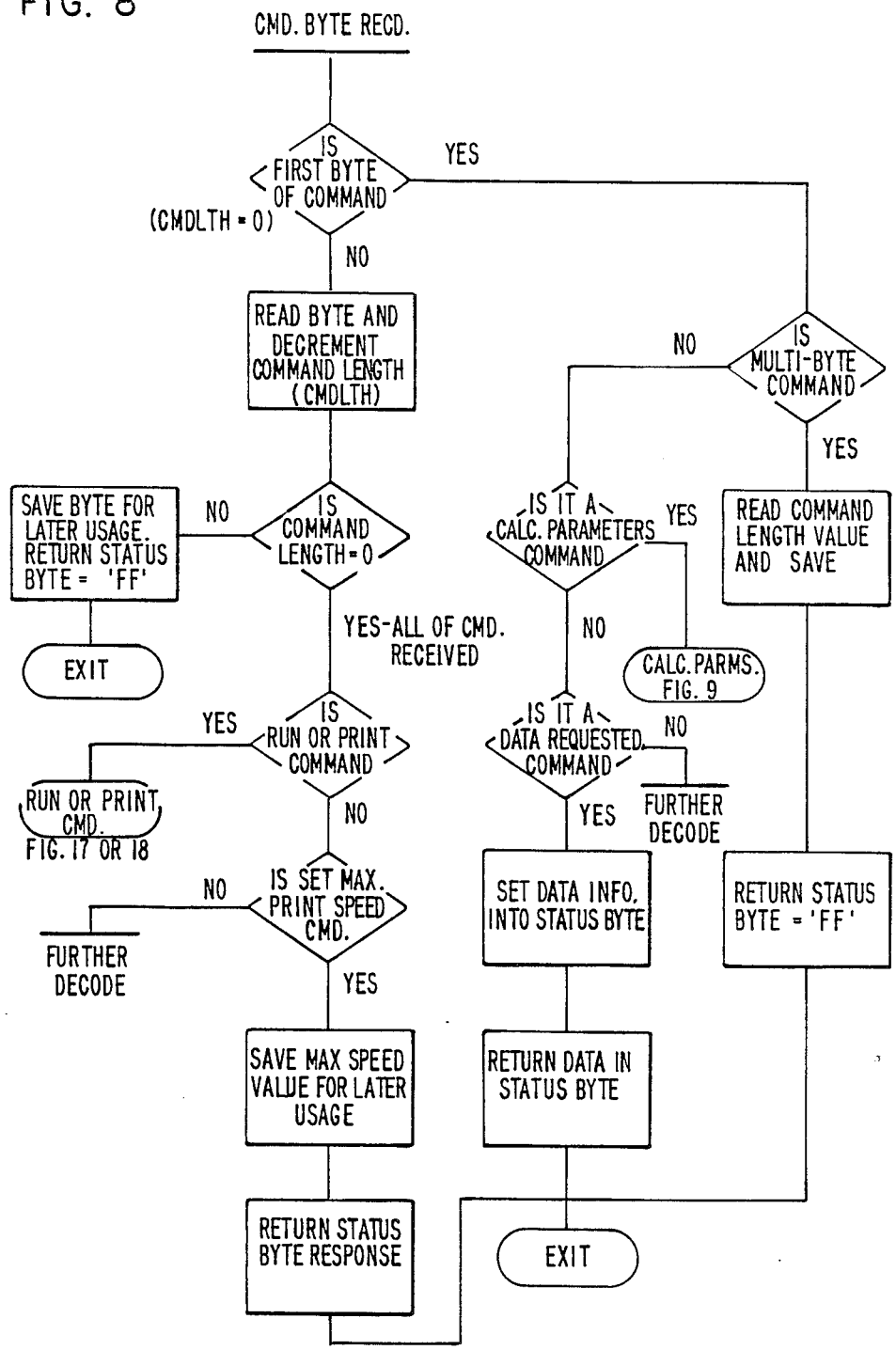
FIG. 8 is a flow chart of the command decode process of the present invention.

Referring now to FIG. 8 a flow chart of the command decode process is illustrated. Whenever a command is expected a register value that indicates the length of the command is set to zero. The first byte of a command is identified as a multi-byte command if the appropriate bit of the command byte is on. If the command is a multi-byte command, the command length as read in the lower bits of the command byte is saved in the command length register. A status value of 'FF' is returned to the mechanism control microcomputer 3 to indicate that the first byte has been received and the head control microcomputer 2 is ready for more information.

After one byte is processed, the routine is exited and is re-entered when the next byte is received. If the command length register is not zero, then additional bytes are expected for this command. For each byte collected, the head control microcomputer 2 sends a byte received status value of 'FF' and decrements the command length register. If the register value equals zero after decrementing, then the byte just received is the last byte expected for this command and the command execution begins. All the information received on the command has been saved byte by byte.

It should be further understood that after power-up that the head control microcomputer 2 first determines voltage vs. velocity parameters and frictional voltage equivalent parameters which are used to generate the proper motor drive voltage valve for any desired speed. The head control microcomputer 2 generates its own sub-commands that initiate special motion commands. These commands are initiated by a "calculate parameters command" from the mechanism control microcomputer 3 which is handled in the sequence shown in FIG. 8.

Figure 9:
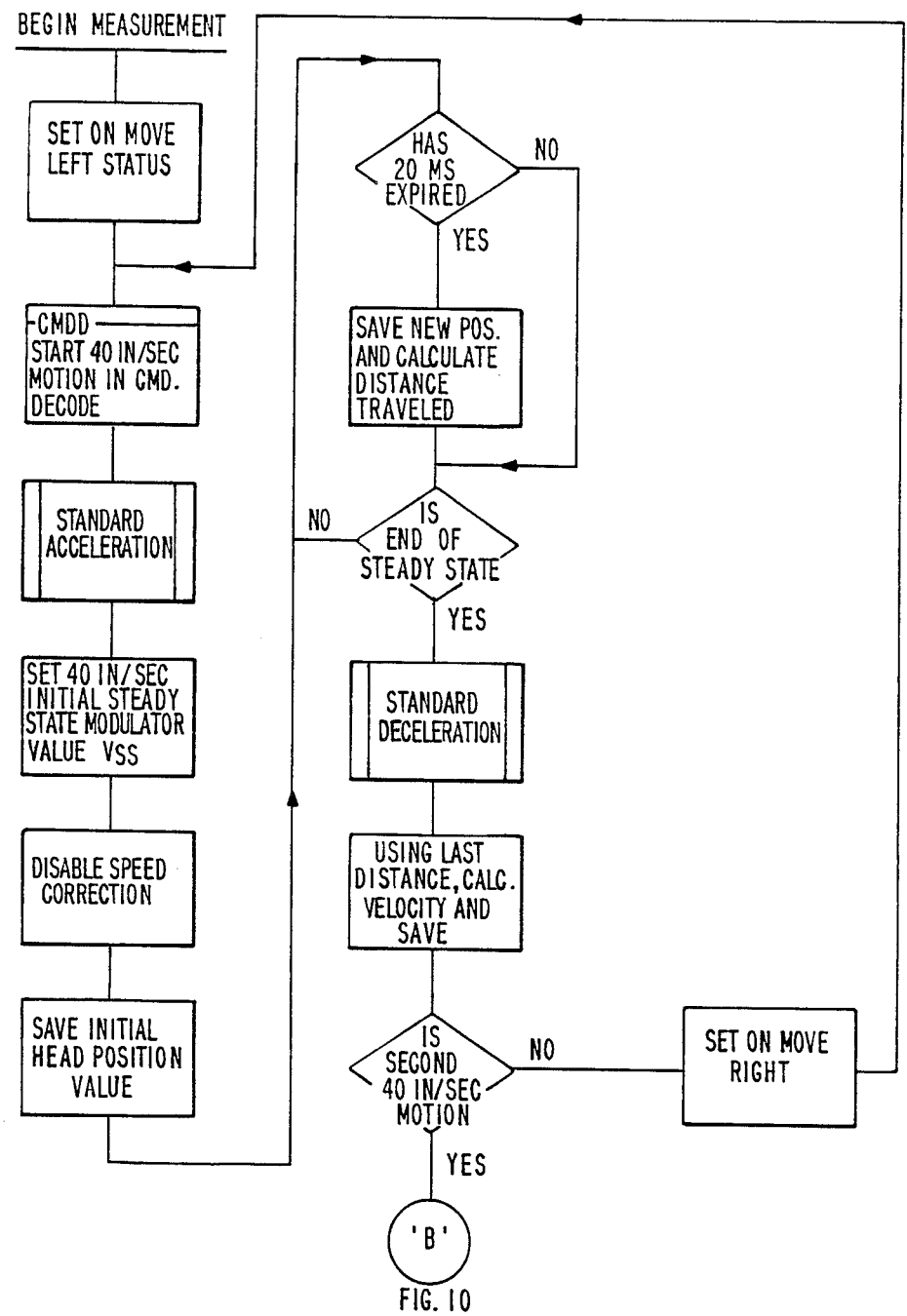
FIG. 9 is a flow chart of the high speed parameter calculation process of the present invention.
Figure 12:
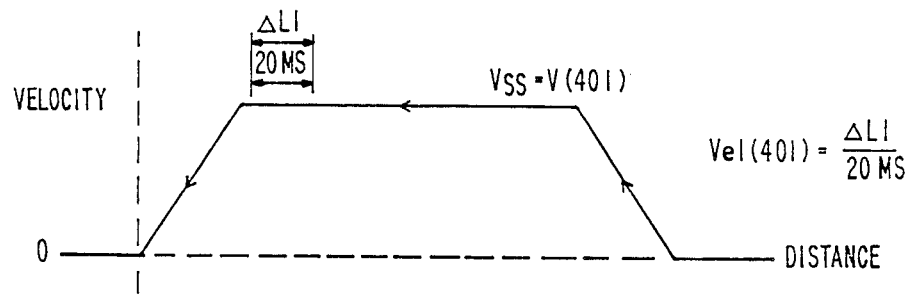
FIG. 12 is a graph illustrating the high speed parameter calculation process when the print head is moving from right to left.
Figure 13:
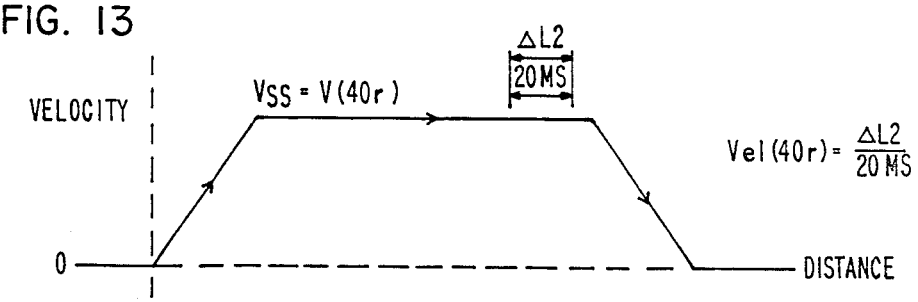
FIG. 13 is a graph illustrating the high speed parameter calculation process when the print head is moving from left to right.

Referring now to FIGS. 9–16, the automatic calculation of the parameters used to generate the appropriate motor drive voltage values for a desired speed will be explained. Before any measurements and calculations are made, the head control microcomputer 2 first determines a starting location to begin counting emitter signals from the encoder 20. The motor 18 is first driven until the printhead contacts the left side frame of the printer. The motor 18 then drives the printhead slowly until the printhead contacts the right side frame. This enables the microcomputer 2 to insure that the printhead 24 has traveled the full width of the machine without mechanical impairment. As illustrated in FIG. 9. A sub-command is generated requesting motion at 40 in/-sec. to the left. The standard command decode sequence is initiated as discussed earlier as well as the standard acceleration which is explained in greater detail hereinafter. Once the steady state speed is reached a steady state drive voltage value is output by the microcomputer 2. This value which represents the initial estimate of a voltage predicted in cause a velocity of 40 in/sec is initially determined by the power-on default values of friction and voltage vs. velocity (slope) constant. In the preferred embodiment the default velocity is calculated as follows:

Default voltage=(defualt slope*desired speed value/256)+friction value (1)

where
friction value=32;
slope value=152;
desired speed value=
6×desired velocity=
6×40=240;
and more specifically is of the form:

Voltage Value=(K*desired speed value)+friction voltage equivalent. (1A)

where K is the value which represents the relationship (ratio) between voltage and velocity changes and the frictional voltage equivalent represents the voltage required in the system to overcome the effects of friction in impeding motion. The magnitude of these two values will be the result of the measurements and calculations to be performed in the following procedures. Initially, these values are given a pre-defined value so as to insure there will be head motion to permit measurements to begin. Speed correction is disabled so that this voltage will be used for the entire line. The initial physical position is saved and measurement is made of the distance traveled in 20 milliseconds. This measurement is made continually while traveling across the line with the last distance measurement made (the final 20 ms period before stopping) being saved. When steady state ends, deceleration occurs in a manner which will be explained in more detail hereinafter. The velocity is this last 20 ms steady state period before deceleration is calculated and saved for use later. The velocity is in general not 40 in/sec. The measured velocity reflects the effects of the applied constant voltage. If only one 40 in/sec motion has been performed, then the direction of motion is set to go right and motion is again begun. The same testing procedure is followed for high speed motion to the right. The final velocity measured when moving to the right is saved after calculation. FIGS. 12 and 13 illustrate this procedure graphically.

Figure 10:
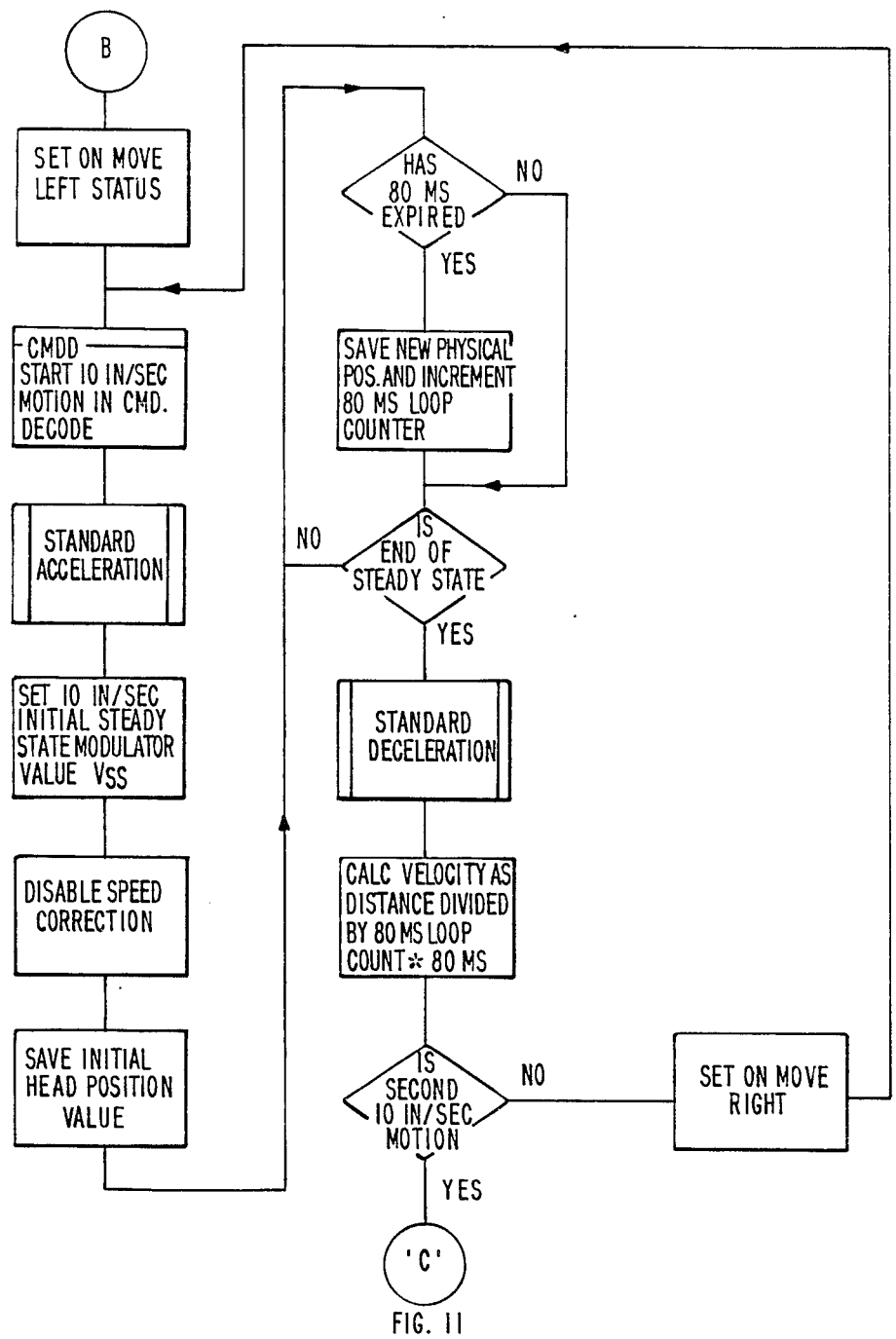
FIG. 10 is a flow chart of the low speed parameter calculation process of the present invention.
Figure 14:
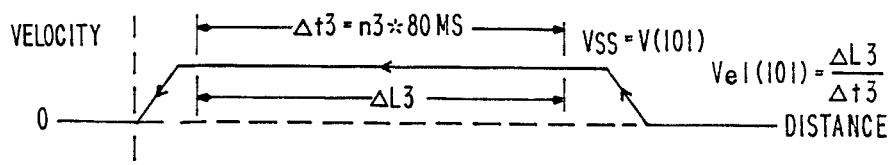
FIG. 14 is a graph of the low speed parameter calculation process when the print head is moving from right to left.
Figure 15:
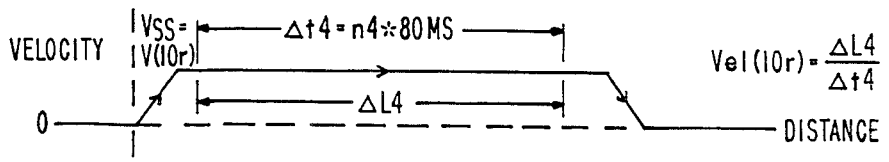
FIG. 15 is a graph of the low speed parameter calculation process when the print head is moving from left to right.

Next, referring to FIG. 10, the voltage value required for lower speed motion is calculated for a speed value of 10 in/sec. The steady state default voltage value is again calculated using equation (1), except that the desired speed value is now 6×10 in/sec=60. When acceleration is complete, the calculated steady state voltage value is output. Speed correction is disabled so that this voltage will be used for the entire line. The initial physical position is saved and a loop counter used to count the number of 80 ms loops is incremented. This measurement is done for the entire length of the line. When steady state ends, standard deceleration occurs. The average velocity for the entire line is calculated and saved for use later. If only one 10 in/sec motion has been performed, then the direction of motion is set to go right and another motion at low speed is initiated. The same testing procedure is followed for motion to the right, with the velocity moving to the right saved after calculation. FIGS. 14 and 15, illustrate this procedure graphically.

Figure 11:
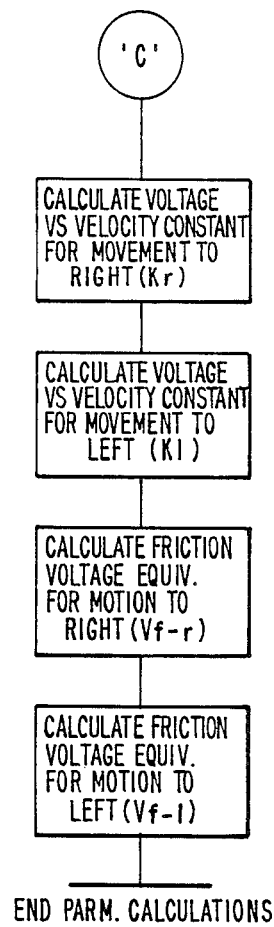
FIG. 11 is a flow chart of the drive parameter calculation process of the present invention.
Figure 16:
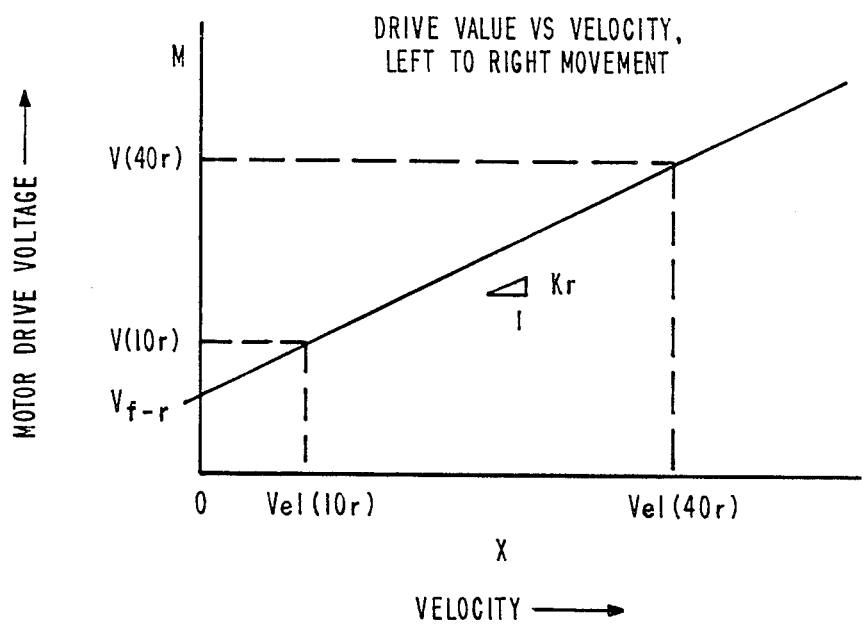
FIG. 16 is a graph illustrating how the slope constant and motor friction value of the present invention are determined.

Now referring to FIG. 11, a flow chart of the drive voltage value parameter calculations is illustrated. A different voltage vs. velocity relationship constant is calculated for each direction. The voltage vs. velocity constants for both directions are calculated by determining the slope of the line between two points in a voltage vs. velocity graph. These points are defined as the measured velocity vs. voltage at the two different speeds for each direction. These constants may then be used to select the proper steady state voltage for a desired velocity in the selected direction. The "Y" intercept of the voltage vs. velocity curve is the voltage required to overcome the frictional effects of the system and initiate motion as illustrated in FIG. 16. There are different frictional values for each direction as well. These values are predetermined by choosing a point on the voltage vs. velocity curve and then calculating the intercept. The point chosen is the 10 inch/second value for each direction which is already known. First, the voltage vs. velocity constant for movement to the right (Kr) is calculated as follows:

$$Kr = \frac{V(40r) - V(10r)}{Vel(40r) - Vel(10r)} \quad (2)$$

where

V(40r)=steady state voltage value for moving right at about 40 in/sec. (high speed);

V(10r)=steady state voltage value for moving right at about 10 in/sec. (low speed);

Vel(40r)=measured high speed velocity when moving right;

Vel(10r)=measured low speed velocity when moving right.

Next, the voltage vs. velocity contant for movement to the left (KL) is calculated as follows:

$$KL = \frac{V(40L) - V(10L)}{Vel(40L) - Vel(10L)} \quad (3)$$

where

V(40L)=steady state voltage value for moving left at about 40 in/sec.;

V(10L)=steady state voltage value for moving left at about 10 in/sec.;

Vel(40L)=measured high speed velocity when moving left;

Vel(10L)=measured low speed velocity when moving left.

Next, the friction voltage equivalent for motion to the right (Vf-r) is calculated as follows:

$$Vf\text{-}r = V(10r) - (Kr \times 10 \text{ in/sec}) \quad (4)$$

where

V(10r)=steady state voltage value for moving right at about 10 in/sec.; and

Kr=voltage vs. velocity constant just calculated for movement to the right.

Finally, the friction voltage equivalent value for motion to the left (Vf-L) is calculated as follows:

$$Vf - L = V(10L) - (KL \times 10 \text{ in/sec}) \quad (5)$$

where

V(10L)=steady state voltage value for moving left at about 10 in/sec; and

KL=voltage vs. velocity constant just calculated for movement to the right.

Once these calculations of voltage vs. velocity constant (Kr, KL) and frictional voltage equivalent (Vf−L, Vf−r) have been made, these values are used in calculations to determine the steady state voltage of motion where the speed value has changed and for low speeds using equation (1A).

A data requested command is performed when requested and is the mechanism for the head control microcomputer 2 to pass data information back to the mechanism control microcomputer 3 when requested. For example, the head position information, indicating the physical distance of the head carrier from the side frame in emitter units (1/300 inch per emitter unit) may be passed back to the mechanism control microcomputer 3 by using two separate data request decodes, passing back 8 bits at a time.

Figure 17:
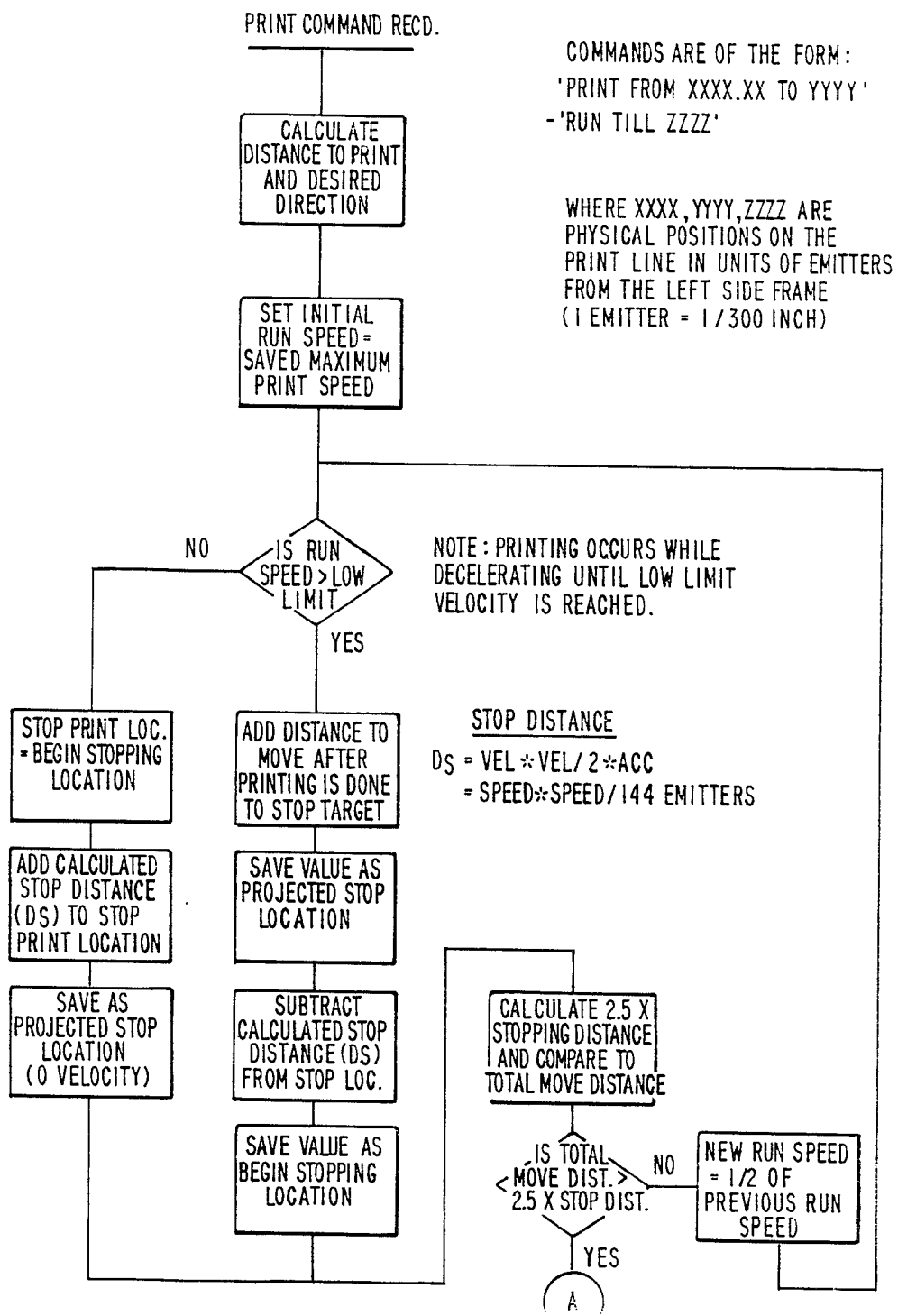
FIG. 17 is a flow chart of the motion speed selection process for a print command utilized in the present invention.
Figure 18:
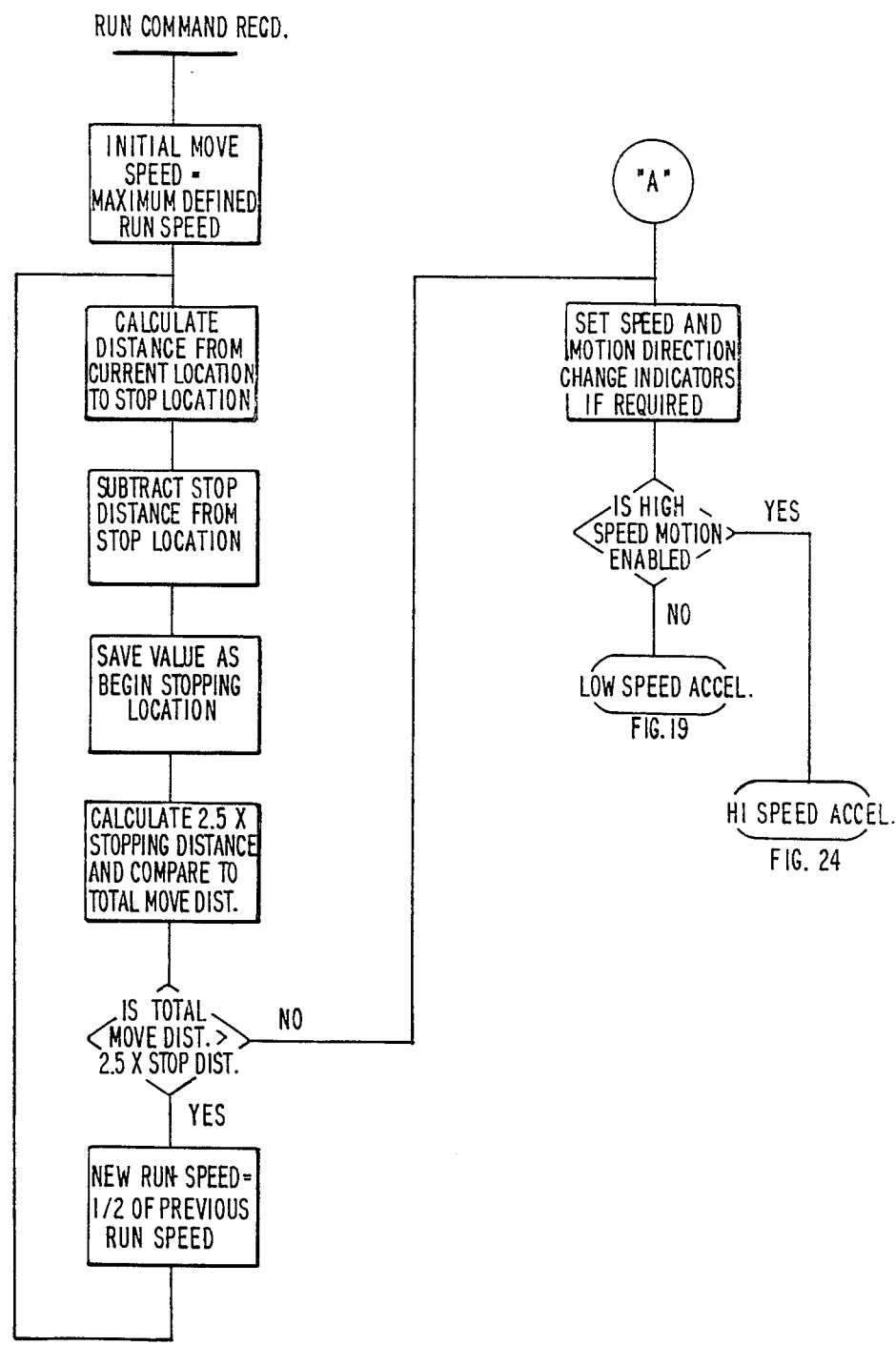
FIG. 18 is a flow chart of the motion speed selection process for a run command utilized in the present invention.

Referring now to FIGS. 17 and 18, the motion speed selection processes for a print command and a run command, respectively, are illustrated. Print commands that are received are of the form indicated, where the term XXXX.XX indicates the whole and fractional emitter position where printing is to be started and YYYY indicates the emitter position when printing is to end. This implies a direction of motion but does not determine the desired speed. The maximum allowable speed for the desired density is sent to the head control microcomputer 2 from the mechanism control microcomputer 3 in a separate command. The head control microprocessor 2 begins speed calculation by determining the total motion distance required for a command. This distance is calculated by subtracting the current or projected zero velocity location from the previous or current motion command to the desired new stop location for a run or print command. For a print command or restricted run command the head control microcomputer 2 uses a preselected speed value from the mechanism control microcomputer 3 as the initial trial speed value. For a run command the trial value is the 40 in/sec velocity value. The head control microcomputer 2 uses the speed value to first calculate the stopping distance from that speed using the following formula:

Assuming a deceleration rate of 600/in/sec/sec $$\text{Distance} = (\text{Velocity} \times \text{Velocity})/(2 \times \text{Acceleration}) \quad (6)$$

Further assuming that the units are chosen such that the velocity is expressed in units that are six times the velocity (in in/sec), the stop distance (in # of emitters from the motor encoder) is calculated as follows:

$$\text{STOP DISTANCE} = (\text{SPEED VALUE})^2/144 \quad (7)$$

The stop distance is then multiplied by 2.5. This result is compared to the total desired movement distance. If the value of 2.5 times the stopping distance is less than the total distance to be moved then the specified speed is used. Otherwise the specified speed is divided in half and the stopping distance and total movement distance for this new speed is calculated. The stop distance value is then multiplied by 2.5 and compared to the new trial movement distance and the velocity value accepted if the trial movement distance is less than the total actual distance to be moved. This iterative process continues until a speed is selected or the velocity value gets less than 5 in/sec at which time the 5 in/sec value is used. Once the desired velocity is selected, then motion status indicators are set indicating speed and direction information. If the speed value indicates that the velocity is less than 10 in/sec then the low speed algorithm is used. If the speed value indicates that the desired velocity is 10 in/sec or greater, then the high speed algorithm is used. Thus, the effect of this algorithm is to reduce the desired velocity value whenever the distances to be traveled are small.

For run commands, the command form indicates that the motion is to be performed by moving the head from the current location (if no motion is taking place) or from the location that the head will be in when the velocity reaches zero after completing the currently active motion (the predicted steop location). Motion is to take place at the fastest speed possible to minimize the time required. This speed is based on the distance to be traveled with faster motion associated with longer distances. Since there will be no printing associated with a run command the initial desired speed is the maximum defined speed for the system.

The distance to be traveled is calculated by subtracting the current or next stopping location from the desired end run position. This distance is compared to 2.5 times the stopping distance for the currently defined speed. If 2.5 times the stopping distance is less than the motion distance, then status is set and motion is initiated at either high or low speed based on the final distance selected. If 2.5 times the stopping distance is greater than the motion distance, then a new run speed is selected by dividing the previous value by 2. Comparison is then performed again and the cycle continues until 2.5 times the stop distance is greater than the movement distance or a minimum velocity of 5 in/sec is reached.

Figure 20:
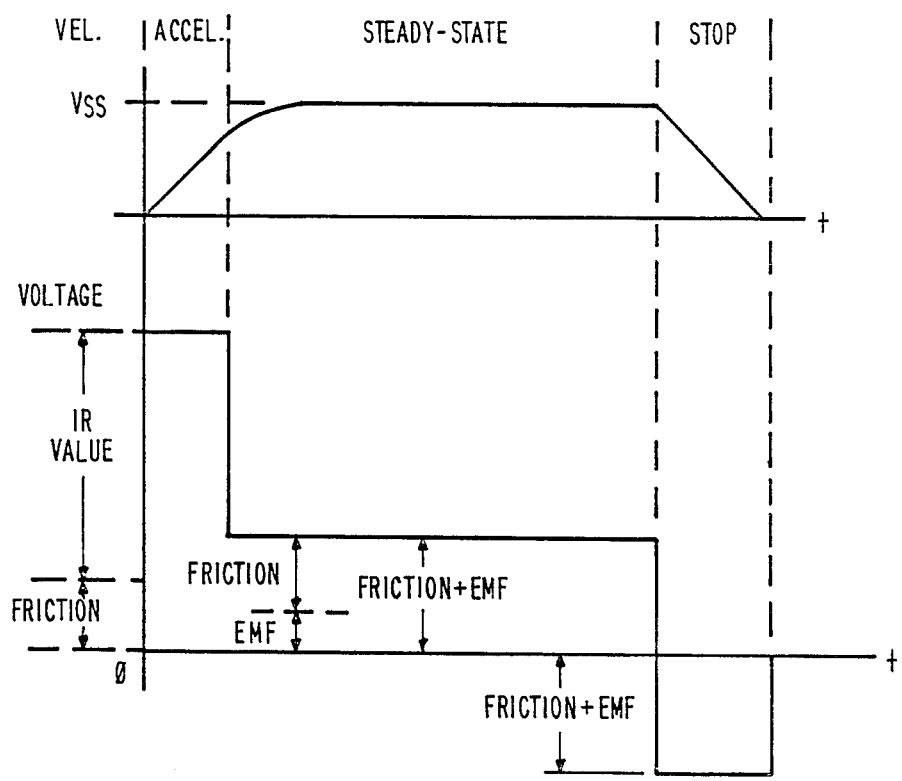
FIG. 20 is a graph illustrating the derivation of the various drive voltages necessary to start the motor, maintain the motor at a steady state velocity and stop the motor as utilized in the present invention.

Referring now to FIGS. 19–23, printhead motion control at low speeds will be described. Low speed motion is defined as motion at velocities less than ten inches/second and is initiated by applying a constant drive voltage to the motor. Referring now to FIG. 9, the drive voltage value is first calculated by adding the friction drive component Vf and motor internal resistance drive component Vir of the motor 18. These components are determined by the technique described elsewhere herein, which is graphically illustrated in FIG. 20. The drive voltage is applied for different periods of time depending on the final desired velocity, by counting a number of motion emitters from the encoder 20 (FIG. 1). The necessary number of emitters to be counted is calculated by multiplying the calculated nominal stopping distance value (velocity squared/4) by a fraction of $\frac{3}{4}$. When the desired number of emitters has been counted the drive voltage is reduced to a steady-state value, as illustrated in FIG. 20. This acceleration period permits the application of the drive voltage for a time which may vary based on the time it takes to move the desired distance and in that respect the drive is responsive to the system. By the drive retains its open loop character with no requirements of velocity monitoring and correction during acceleration.

Figure 21:
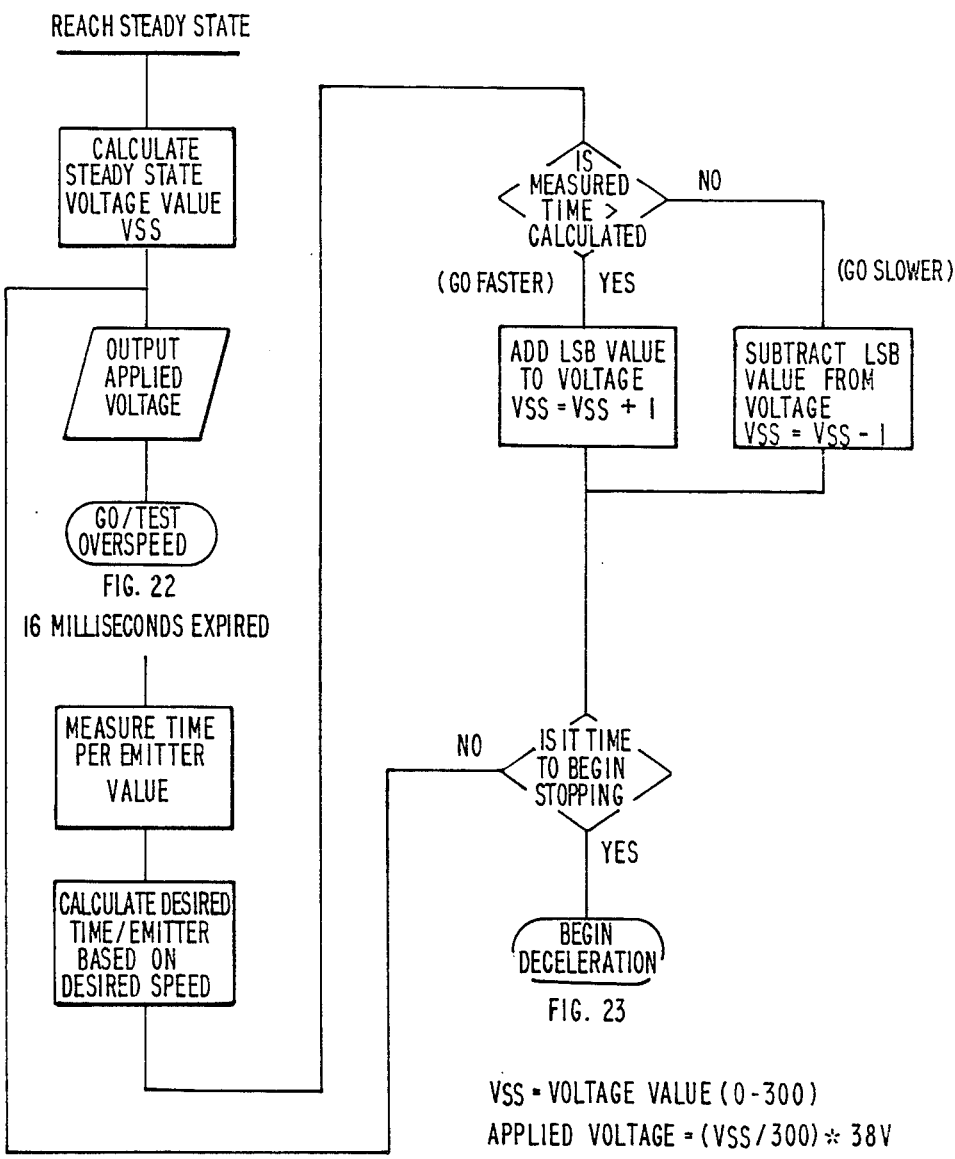
FIG. 21 is a flow chart of the low speed steady state correction process of the present invention.

Referring now to FIG. 21, a flow chart for low speed steady-state operation of the printhead motor is illustrated. The drive voltage applied at steady-state is calculated by adding the average frictional drive voltage term to the calculated drive Emf value (the calculated drive value times the slope term which is explained elsewhere herein) to give the voltage required to maintain the drive at a constant velocity (See FIG. 20). (Different Emf and friction values are kept for the left and right direction and the slope value relates the drive voltage to the desired velocity as explained earlier herein.) This voltage is applied after acceleration is completed which is usually just before the desired steady state velocity is reached. For low speeds the time between emitters is such that a small number of emitters are received in the sixteen millisecond sampling period. Therefore, the individual emitter time is measured instead of the number of emitters per sampling time. The time per emitter must be calculated based on the current velocity for comparison with the measured value. These two numbers are compared and if the measured value is larger than the desired value then the drive to the motor is increased by one LSB of the drive number. The location in memory that saves the drive value is also increased by one LSB. If the measured value is smaller than the calculated value then the drive voltage is decreased by one LSB and also the drive value in memory. This same procedure continues, repeating the measurement and calculations every 16 ms until the head begins stopping. The time per emitter is calculated by multiplying the number of emitters per inch (300) times the velocity and taking the inverse. When scaled, this equation reduces to the following division:

TIME/EMITTER = 20,000/SPEED VALUE   (8)

where SPEED VALUE = 6×desired velocity (in in/sec).

The drive value which remains at the end of the line is not used as is done in the high speed mode because the variation in mechanical friction across the line is reflected to a much greater extent in low speed operation and makes the drive values subject to error.

Figure 22:
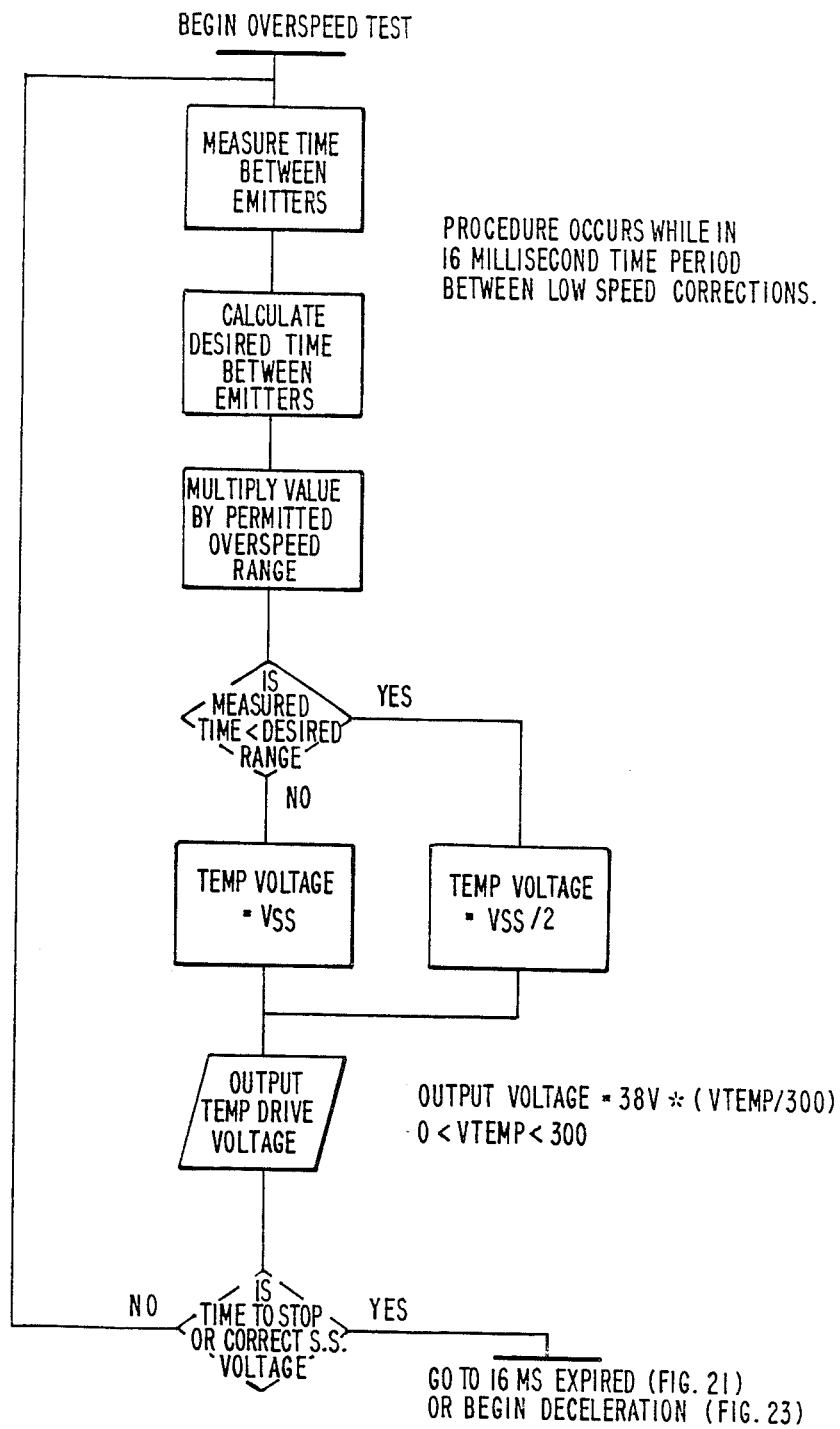
FIG. 22 is a flow chart of the overspeed test process of the present invention.

Referring now to FIG. 22, the flow chart for low velocity overshoot is illustrated. At zero velocity the desired time between emitters is calculated and saved, but is not used for low speeds. When speed compensation is enabled an overspeed value is calculated and saved. The overspeed value represents the emitter time for a velocity of 1 and 1/16th of the desired velocity. The emitter time value register contains the current emitter time and when this value is smaller than the overspeed value the velocity is six percent overspeed. The current emitter time value is compared to the overspeed value during 16 ms test period while in the steady state operation. Whenever the comparison indicates the velocity is more than six percent overspeed the total drive voltage is cut in half. When the velocity decreases to the point where the emitter time indicates that the velocity is now less than six percent overspeed the current drive voltage is restored to the current standard value. If it is time to begin stopping, the head control microcomputer 2 begins the decelerating routine which will be explained more fully hereinafter, otherwise it returns to the 16 milliseconds expired routine of FIG. 21.

Referring now to FIG. 23, a flow chart for the deceleration routine is illustrated. Deceleration from a low speed is accomplished by simply applying a voltage equal to the current steady state value in the opposite direction. Polarity is reversed by changing the logic level of RIGHT/LEFT line of head control microcomputer 2 and by outputting the complement of the current drive voltage value from the head control microcomputer over the line 6 to the timer counter 10. This value is output until the time between emitter changes reduces to a minimum value or until the emitter sequence reverses. When either one of these two events occurs, the head will be said to be at zero velocity and the drive will be shut off.

As mentioned earlier, when printing is to be performed the mechanism control microcomputer 3 must have previously sent a set print speed command to the head control microcomputer 2. This command fixes the maximum print speed while the actual print speed is selected by the head control microcomputer. This desired speed value is saved while waiting for the current command to complete. When the run command is initiated, the desired speed value is used as the run speed. At power on or when the cover was last closed, the head control microcomputer 2 calculated several values which represent the frictional characteristics of the machine and slope constant values which relate the drive voltage to a desired velocity. The frictional value represents the voltage required to overcome the average frictional effects of the machine. A separate value is calculated and maintained for each direction of movement of the head. The values are used as part of the calculation of the drive voltages applied to the motor. The other values which were calculated are the "slope constant" terms which relate a desired velocity to the voltage required to achieve that velocity by the following formula:

$$\text{VOLTAGE} = (\text{SLOPE CONSTANT} * \text{VELOCITY}) + \text{FRICTIONAL VOLTAGE EQUIVALENT} \qquad (9)$$

There are two slope values, one for the right direction and left direction. The voltage value that results is the voltage that is required to move the head at the steady state speed desired and is called the steady state drive voltage term (Vss). This drive voltage term represents the drive applied to the motor and is different from the above calculation when accelerating and decelerating. The above equation expresses the means by which the drive voltage value is calculated whenever the desired velocity has changed. When the velocity for a command has not changed from the previous command then the steady-state drive value is not calculated, but the last value used in that same direction is then used as a better estimate of the desired drive value.

Figure 24:
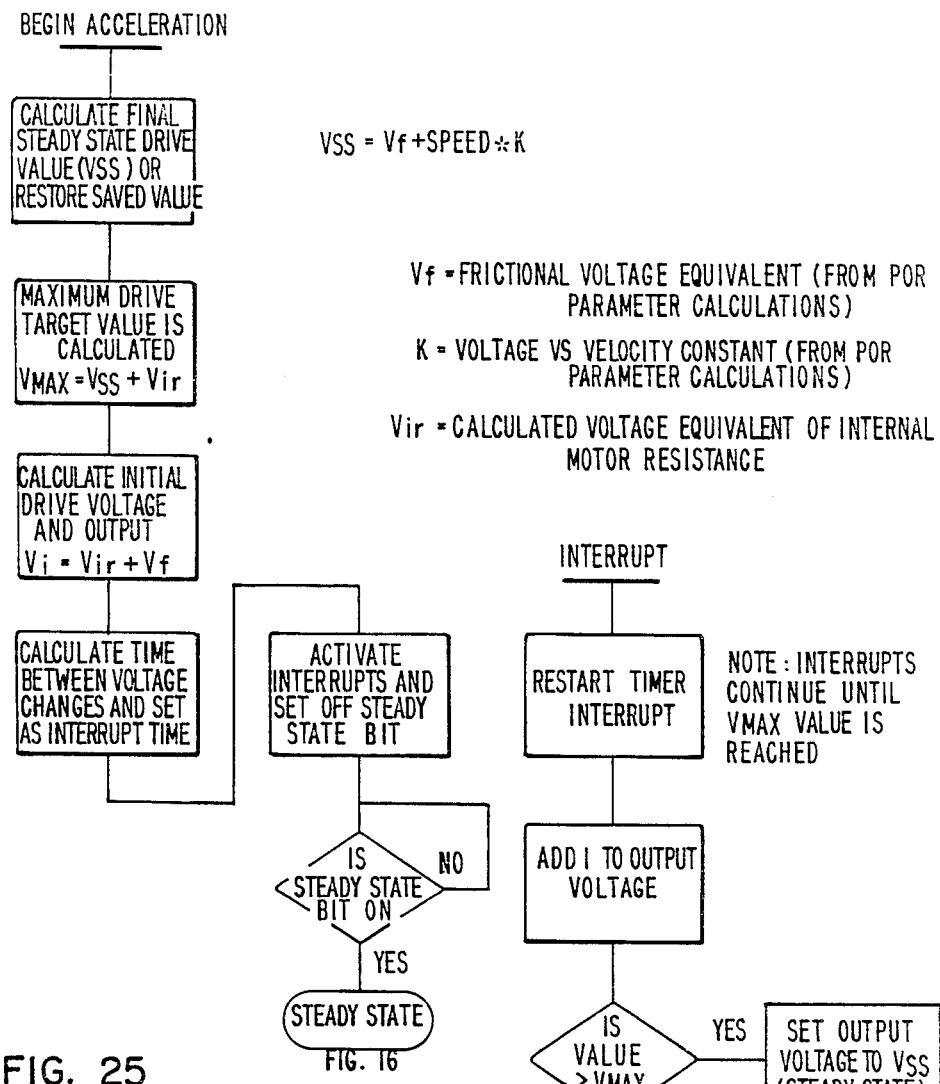
FIG. 24 is a flow chart of the high speed acceleration process of the present invention.
Figure 25:
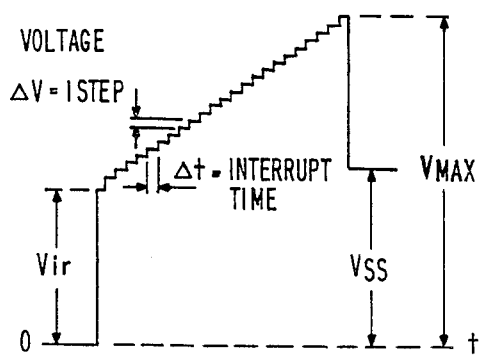
FIG. 25 is a graph illustrating the high speed acceleration process of the present invention.

Referring now to FIGS. 24 and 25, the high speed acceleration process is illustrated by a flow chart and a graph, respectively. The high speed mode of operation includes velocities from 10 in/sec up to 40 in/sec and comprises an open loop acceleration period in which the drive voltage is set to a value initially and is increased to a final value in steps (See FIG. 24) one bit at a time at each interrupt time. The time between voltage changes while accelerating is typically between 350 and 450 microseconds depending on the voltage count value remaining from the previous direction and the predicted steady state voltage value for the new direction and is determined by the following equation:

$$\Delta T = \frac{(VEL/40) * .133 \text{ sec}}{VC1 + VC2} \qquad (10)$$

where
VEL = desired velocity
VC1 = count value of motor drive signal from head control microcomputer for steady-state voltage for right direction
VC2 = count value of motor drive signal from head control microcomputer for steady state voltage for left direction
40 = 40 in/sec maximum velocity
0.133 = turnaround time for 40 in/sec motion The voltage values output during acceleration increase from the initial value until a final value is reached. Then, the interrupts that were used to determine when to change the voltage value are shut off and the drive voltage is then reduced to a steady-state drive value and velocity correction is enabled. The initial drive voltage is the sum of the frictional term and another term called the "IR" term which represents the extra voltage required to overcome the internal resistance of the motor. The IR term is a constant based on the motor characteristics and load parameters and in the preferred embodiment is a value of 96. This term is present for the entire acceleration time. Starting from the sum value of the frictional term and the IR term, an additional count is added thereto at predetermined intervals. The motor drive voltage value is periodically increased (decreased to increase a negative value for movement to the left) at a rate determined by the time indicated in equation 10. This continues until the value reaches a maximum calculated value represented by the sum of the frictional value, the "IR" value and the steady state drive term. Once the final value is reached, the steady state drive voltage is set. There is an additional method to achieve steady state from an acceleration. This is done by reaching the desired steady state velocity before the voltage values reach the desired maximum drive value. While accelerating, the head control microcomputer 2 monitors the time between emitters and compares the measured value to a calculated value representing the desired steady state velocity. If the time between emitters becomes less than or equal to the calculated value, the desired final velocity has been reached. This end criterion becomes extremely important when motion begins at speeds other than zero velocity.

Figures 26, 27:
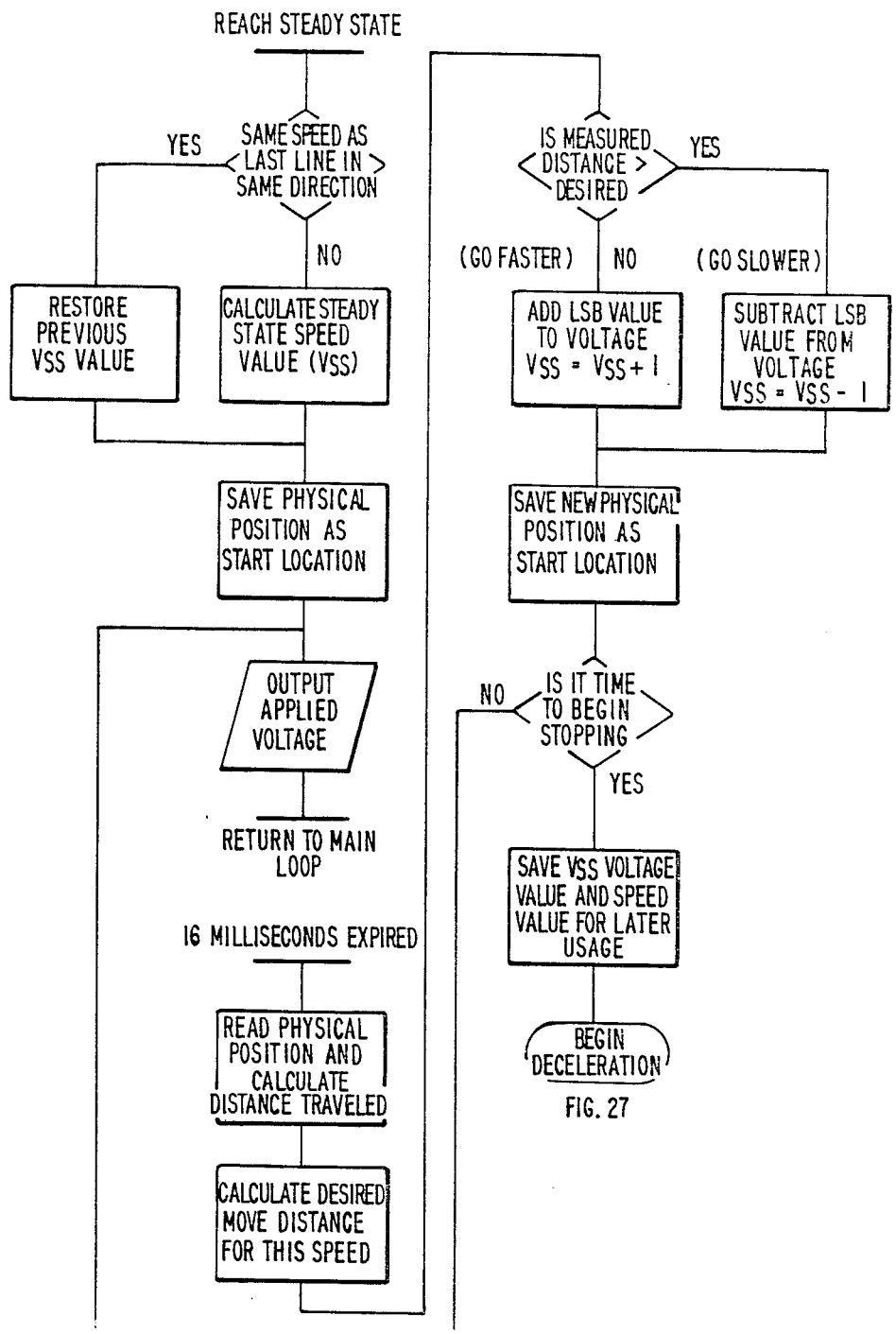
FIG. 26 is a flow chart of the high speed steady state velocity correction process of the present invention.
FIG. 27 is a flow chart of the high speed deceleration process of the present invention.
Figure 27:
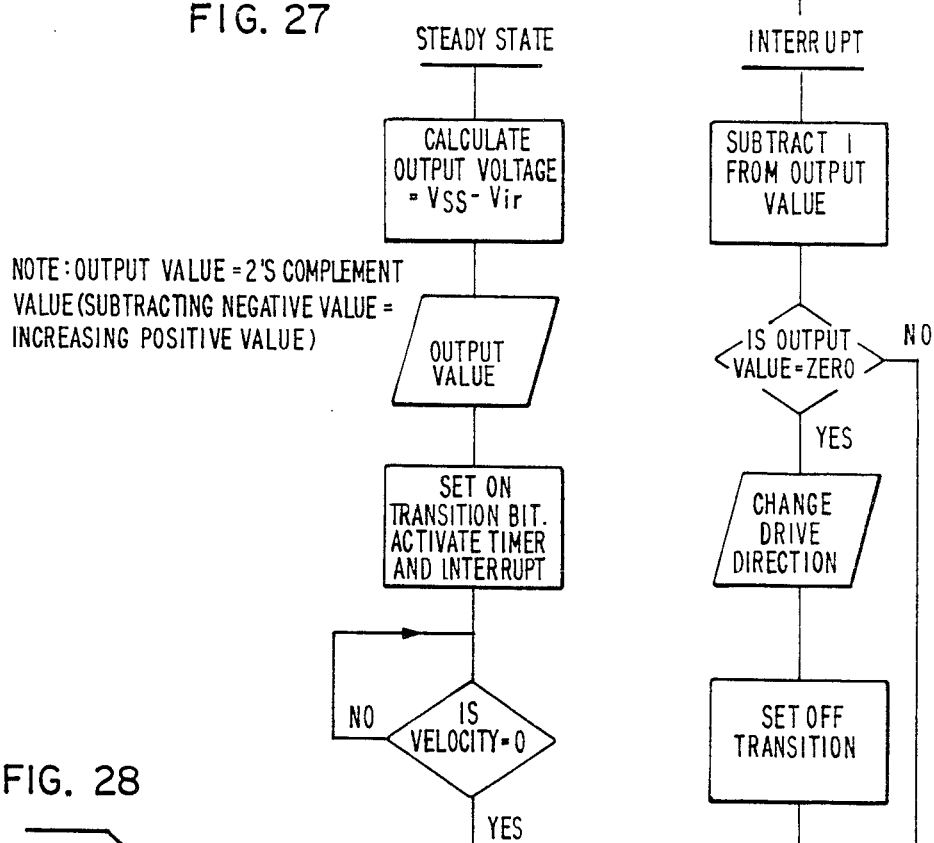

Referring now to FIG. 26, the flow chart for high speed steady state velocity correction is illustrated. Once the maximum drive value or desired velocity has been reached, the drive voltage output is set to the steady state voltage value that is the sum of the frictional value plus the Emf voltage drive value as mentioned before.

The head control microcomputer 2 counts the number of emitter changes received from the encoder 20 attached to the head motor 18 in a preselected time period (16 ms) at steady state speed. The number of emitters that should be traveled (the distance) at the desired speed is also then calculated. These two numbers are compared and if the measured value is larger than the desired value then the drive to the motor is decreased by one LSB of the drive number from the head control microcomputer 2 (each LSB is equal to 1/300 of full scale). The location in memory that saves the drive value for the left or right direction of motion is also decreased by one LSB. If the measured value is smaller than the calculated value then the drive voltage is increased by on LSB and also the drive value in memory. This same procedure continues, repeating the measurement and calculations every 16 ms until the head begins stopping. The number of emitters is calculated by multiplying the number of emitters per inch 9300) times the speed value (6 times the speed in in/sec) times 16 ms. When properly scaled this equation becomes:

$$\text{NUMBER OF EMITTERS} = 0.796 * \text{SPEED VALUE} \qquad (11)$$

The drive voltage value which remains at the end of the line is saved and used as the initial drive voltage value the next time the head is moving in the same direction if the speed has not changed. If the head speed is changed then this drive value is lost and is replaced by the calculated initial drive value for the new speed. A different drive value is saved for each direction to account for drive component and frictional differences. When stopping begins the last drive value is saved for use the next time motion is in th same direction and the speed has not changed.

Figure 28:
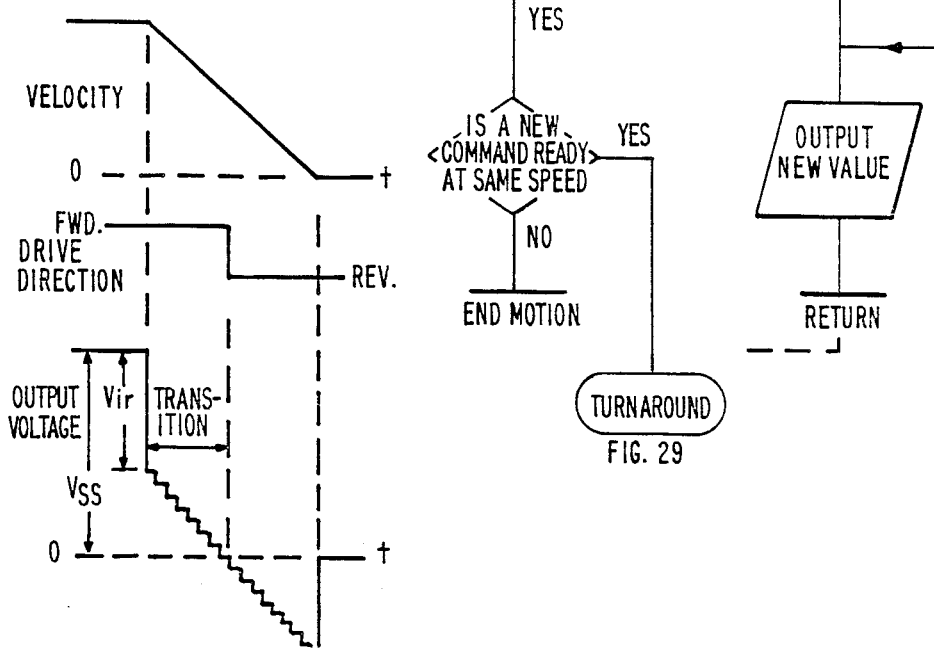
FIG. 28 is a graph illustrating the high speed deceleration process of FIG. 27.

Referring now to FIGS. 27 and 28, a flow chart and graph, respectively, of the high speed deceleration process are illustrated. It should be noted that deceleration is performed in a manner similar to acceleration and utilizes the same interrupting technique tht was used in acceleration and utilizes the same time between interrupts as was used in acceleration. The "IR" voltage value is subtracted from the current drive voltage value. This resulting value is then tested. If the result is less than or equal to zero a drive voltage of opposite polarity is applied to the motor by changing the logic level of the left/right line from the head control microcomputer 2. If the result is greater than zero, the system is considered to be in a "Transition mode". If the steady state voltage is less than the "IR" voltage value, then there is no transition region. In "Transition mode" the drive direction transistors are not changed to the opposite state, but a modified drive signal from the decoder 14, controlled by the motor drive value from the lead control microcomputer 2, is applied to either the lower transistor Q3 or Q4 of the currently active section of the "H" driver. The drive signal from the decoder 14 is modified by outputting the magnitude complement of the current modulator value from the head control microcomputer 2. The magnitude complement is calculated by subtracting the modulator value from 300. A "Transition mode" bit is also set on. Starting from a value represented by the sum of the frictional term plus the Emf motion term (the steady state drive voltage value) minus the IR term, an additional count is subtracted therefrom periodically. The rate of which the motor drive value from the head control microcomputer 2 is changed is determined from equation 10. The motor drive value is decreased when moving right (for motion to the left a negative value is increased). This voltage decrease is performed in an interrupt routine. If the transition bit is on the motor drive value is magnitude complemented before being output. This drive value decrease procedure continues until the motor drive value reaches zero or until zero velocity is reached. When zero voltage is reached, the transition region is set off and the drive direction is changed. Once a motor drive value of zero is reached when decelerating with the "Transition mode" bit on, the drive control output is modified to activate drive in the opposite direction and the modulator value represents a positive drive in the other direction. When zero velocity is reached the head control microcomputer 2 tests to see if another command is pending. If the next command is ready and is for the same final speed as the previous command but in the opposite direction and the speed is not a "Low speed" operation then the "turnaround sequence" is used. If the conditions for the Turnaround sequence are not met, head motion is stopped and the next command is processed in the normal way.

Figures 29, 30:
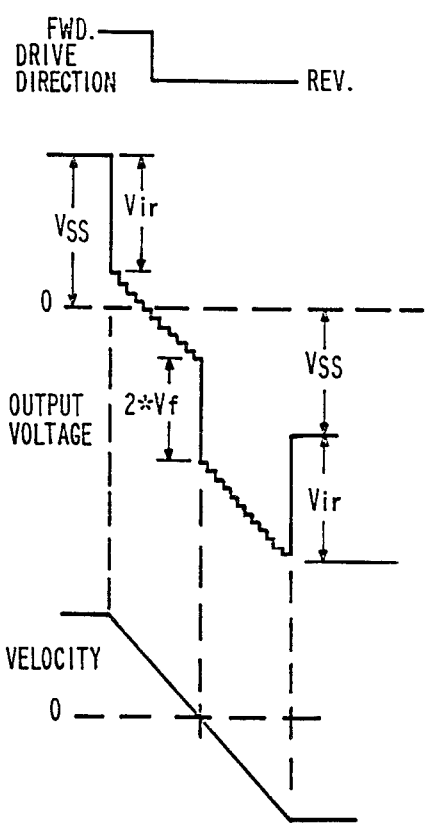
FIG. 29 is a flow chart of the turnaround process of the present invention.
FIG. 30 is a graph illustrating the turnaround process of FIG. 29.

Referring now to FIGS. 29 and 30, a flow chart and graph, respectively, of the turnaround process are illustrated. In a turnaround motion the head is to continue traveling in the current direction that is active while stopping (the opposite direction from the previous motion) without waiting at zero velocity. When zero velocity is reached after a deceleration and turnaround is required, the frictional voltage value is doubled and is then subtracted from the current voltage value (or is added if motion is in the opposite direction). This voltage change reflects the fact that the frictional effects that were helping stop the head will now work in the opposite direction to impede acceleration and permits the motion to continue without stopping as illustrated in FIG. 20. After zero velocity has been reached, the standard acceleration voltage change procedure including interrupts at the previously defined rate are performed until the maximum voltage or desired steady state velocity is reached.

What we claim as new and desire to be covered by U.S. Letters Patent is:

1. A printhead control system for compensating the steady-state speed of a print head as it moves across a record medium, said print head being bidirectionally movable across said record medium at either a speed from a first group of speeds or a speed from a second group of speeds, comprising:

motor means having a rotatable shaft, coupled to said print head, for moving said printhead as said shaft rotates;

means for generating measured print head speed information;

processor means, connected to said means for generating measured printhead speed information, said processor means including control signal means for generating a motor drive voltage control signal and means for providing information indicating a desired print head speed selected from said first or second group of speeds;

control circuit means, connected to said processor means and said motor means, for applying a motor drive voltage to said motor means, said motor drive voltage being controlled by the value of said motor drive voltage control signal, whereby the speed of said print head is controlled;

said processor means including means for receiving said measured speed formation and for comparing said measured speed information to said desired speed information during predetermined time intervals to determine the direction of any difference and means for changing the value of said motor drive voltage control signal applied by said control circuit means by an equal amount in the direction to decrease said difference for each said time interval said measured speed information differs from said desired speed information until said desired speed is reached or until said desired print head speed is changed.

2. The printhead control system according to claim 1, wherein:

said means for generating measured printhead speed information includes emitter means coupled to said shaft for providing pulses representing increments of movement of said shaft; and said processor means, when said print head is moving at any speed from said second group of speeds, determines the measured time between pulses from aid emitter means and compares said measured time between pulses to the time between pulses which represents said desired speed as determined by said processor means during each said time interval and increments said motor drive voltage control signal an equal amount for each said time interval when said measured speed is less than said desired speed or decrements said motor drive control voltage signal an equal amount for each said time interval when said measured speed is greater than said desired speed.

3. The printhead control system according to claim 1, wherein:

said control circuit means including a circuit for generating a constant period and frequency pulse width modulated signal, the duty cycle of which determines the duration of time the motor drive voltage is applied to said motor means.

4. The printhead control system according to claim 1, wherein:

said means for generating measured printhead speed information includes emitter means coupled to said shaft for providing pulses representing increments for movement of said shaft; and said process means, when said desired print head speed is from said first group of speed, counts the measured number of pulses from said emitter means and compares said measured number of pulses to the number of pulses which represents said desired speed as determined by said processor means during each said time interval and increments said motor drive voltage control signal an equal amount for each said time interval when said measured speed is less than said desired speed or decrements said motor drive control voltage signal an equal amount for each said time interval when said measured speed is greater than said desired speed.

5. The printhead control system according to claim 4, wherein:
said processor means, when said print head is moving at any speed from said second group of speeds, determines the measured time period between pulses from said emitter means and compares said measured time period between pulses to the time period between pulses which represents said desired speed as determined by said processor means during each said time interval and increments said motor drive voltage control signal an equal amount for each said time interval when said measured speed is less than said desired speed or decrements said motor drive control voltage signal an equal amount for each said time interval when said measured speed is greater than said desired speed.

* * * * *